(12) United States Patent
Reid et al.

(10) Patent No.: US 9,372,641 B2
(45) Date of Patent: Jun. 21, 2016

(54) SLIDING-WINDOW MULTI-CLASS STRIPING

(71) Applicant: MICROSOFT TECHNOLOGY LICENSING, LLC, Redmond, WA (US)

(72) Inventors: Colin Reid, Redmond, WA (US); Philip A. Bernstein, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/694,891

(22) Filed: Apr. 23, 2015

(65) Prior Publication Data

US 2015/0227315 A1 Aug. 13, 2015

Related U.S. Application Data

(62) Division of application No. 13/868,887, filed on Apr. 23, 2013, now Pat. No. 9,043,546, which is a division of application No. 12/426,783, filed on Apr. 20, 2009, now Pat. No. 8,799,572.

(51) Int. Cl.
G06F 12/16 (2006.01)
G06F 3/06 (2006.01)

(52) U.S. Cl.
CPC .............. *G06F 3/067* (2013.01); *G06F 3/0613* (2013.01); *G06F 3/0631* (2013.01); *G06F 3/0683* (2013.01); *G06F 3/0689* (2013.01)

(58) Field of Classification Search
CPC ... G06F 3/0689; G06F 3/0613; G06F 3/0631; G06F 3/067

USPC .................................................. 711/114, 162
See application file for complete search history.

(56) References Cited

U.S. PATENT DOCUMENTS

| | | |
|---|---|---|
| 5,255,387 A | 10/1993 | Arnold et al. |
| 5,263,155 A | 11/1993 | Wang |
| 5,537,574 A | 7/1996 | Elko et al. |
| 5,619,690 A | 4/1997 | Matsumani et al. |
| 5,724,539 A | 3/1998 | Riggle et al. |
| 6,092,156 A | 7/2000 | Schibinger et al. |
| 6,125,424 A | 9/2000 | Komatsu et al. |

(Continued)

OTHER PUBLICATIONS

"FusionStor", retrieved from <http://www.meganet1.com/pdf/atomic.pdf>, downloaded on or before Jan. 27, 2009, 2 pages.

(Continued)

*Primary Examiner* — Son Dinh
(74) *Attorney, Agent, or Firm* — Aneesh Mehta; Kate Drakos; Micky Minhas

(57) ABSTRACT

A sequence of storage devices of a data store may include one or more stripesets for storing data stripes of different lengths and of different types. Each data stripe may be stored in a prefix or other portion of a stripeset. Each data stripe may be identified by an array of addresses that identify each page of the data stripe on each included storage device. When a first storage device of a stripeset becomes full, the stripeset may be shifted by removing the full storage device from the stripeset, and adding a next storage device of the data store to the stripeset. A class variable may be associated with storage devices of a stripeset to identify the type of data that the stripeset can store. The class variable may be increased (or otherwise modified) when a computer stores data of a different class in the stripeset.

20 Claims, 25 Drawing Sheets

(56) References Cited

U.S. PATENT DOCUMENTS

| | | |
|---|---|---|
| 6,182,121 B1 | 1/2001 | Wlaschin |
| 6,219,752 B1 | 4/2001 | Sekido |
| 6,226,728 B1 | 5/2001 | See et al. |
| 6,233,648 B1 | 5/2001 | Tomita |
| 6,240,413 B1 | 5/2001 | Learmont |
| 6,256,705 B1 | 7/2001 | Li et al. |
| 6,353,828 B1 | 3/2002 | Ganesh et al. |
| 6,681,226 B2 | 1/2004 | Bretl et al. |
| 6,701,520 B1 | 3/2004 | Santosuosso et al. |
| 6,941,420 B2 | 9/2005 | Butterworth et al. |
| 6,990,561 B2 | 1/2006 | Yae et al. |
| 7,003,632 B2 | 2/2006 | Jamil et al. |
| 7,055,058 B2 | 5/2006 | Lee et al. |
| 7,103,597 B2 | 9/2006 | McGoveran |
| 7,143,256 B2 | 11/2006 | Maciel |
| 7,243,193 B2 | 7/2007 | Walmsley |
| 7,318,110 B2 | 1/2008 | Yumoto et al. |
| 7,434,010 B2 | 10/2008 | Duffy et al. |
| 7,447,709 B1 | 11/2008 | Rozenman et al. |
| 7,801,866 B1 | 9/2010 | Kathuria et al. |
| 7,890,726 B1 | 2/2011 | Falik et al. |
| 8,347,050 B2 | 1/2013 | Bernstein et al. |
| 2002/0091717 A1 | 7/2002 | Shi et al. |
| 2002/0116457 A1 | 8/2002 | Eshleman et al. |
| 2002/0138483 A1 | 9/2002 | Bretl et al. |
| 2002/0161735 A1 | 10/2002 | Cheng et al. |
| 2003/0018878 A1 | 1/2003 | Dorward et al. |
| 2006/0101064 A1 | 5/2006 | Strong et al. |
| 2006/0112150 A1 | 5/2006 | Brown et al. |
| 2006/0271731 A1 | 11/2006 | Kilian et al. |
| 2006/0288008 A1 | 12/2006 | Bhattiprolu et al. |
| 2007/0174333 A1 | 7/2007 | Lee et al. |
| 2007/0198518 A1 | 8/2007 | Luchangco et al. |
| 2008/0065649 A1* | 3/2008 | Smiler .............. G06F 17/30893 |
| 2008/0120297 A1 | 5/2008 | Kapoor et al. |
| 2008/0256292 A1 | 10/2008 | Flynn et al. |
| 2009/0024578 A1 | 1/2009 | Wang et al. |
| 2009/0125563 A1 | 5/2009 | Wong et al. |
| 2009/0172335 A1 | 7/2009 | Kulkarni et al. |
| 2009/0292861 A1 | 11/2009 | Kanevsky et al. |
| 2010/0010967 A1 | 1/2010 | Muller |
| 2010/0198914 A1 | 8/2010 | Gehrke et al. |
| 2010/0268876 A1 | 10/2010 | Reid et al. |

OTHER PUBLICATIONS

"Optimistic Concurrency Control", retrieved from <http://www.cs.unc.edu/-dewan/242/s99/notes/Irans/node7 .html>, Nov. 6, 2008, 1 Page.

Actel, Application Note AC194, "Content-Addressable Memory (CAM) in Actel Devices", Dec. 2003, 8 pages.

Amiri et al., "Highly Concurrent Shared Storage", retrieved from <http://www.pdl.cmu.edu/PDL-FTP/NASD/icdcs.pdf>, Appears in the Proceedings of the International Conference on Distributed Computing Systems, Taipei, Apr. 2000, 10 Pages.

Houston, "Sanbolic Provides Cost-Effective Shared Storage Solution for Windows Server 2008", retrieved at <http://www.pressreleasepoint.com/sanbolic-provides-costeffective-shared-storage-solution-windows-server-2008-hyperv-deployments>, Jul. 8, 2008, 1 Page.

Huang et al., Concurrency Control Protocol for Broadcast-based Transaction Processing and Correctness Proof, retrieved from <http://citeseerx.isl.psu.edu/viewdoc/download;jsessionid=68E3E6673C3AFB552399DEB2E4E91434?doi=10.1.1.13.4000&rep=rep1 &type=>, 2001, 6 Pages.

Kung et al., "On Optimistic Methods for Concurrency Control", retrieved from <http://www.seas.upenn.edu/-zives/cis6501papers/opt-cc.pdf>, ACM Transactions on Database Systems, vol. 6, No. 2, Jun. 1981, pp. 213-226.

Robinson, John T., "Design of Concurrency Controls for Transaction Processing Systems", retrieved from <http://oai.dtic.mil/oai/oai?&verb=getRecord&metadataPrefix=html&identifier=ADA121515>, Apr. 12, 1982, 1 Page.

"Log-Structured file system", retrieved at <http://en.wikipedia.org/wiki/Log-structured_file_system>, Jan. 23, 2009, 3 pages.

"Log-Structured File System (BSD)", retrieved at <http://en.wikipedia.org/wiki/Log-structured_File_System_(BSD)>, Jan. 23, 2009, 2 pages.

Zhang, et al., "SLAS: An efficient approach to scaling round-robin striped volumes", ACM Transactions on Storage, retrieved at <http://portal.acm.org/citation.cfm?id=1227835.1227838>, vol. 3, No. 1, Mar. 2007, pp. 1-39.

Kozlerok, Charles M., "Stripe Width and Stripe Size", retrieved at <http://www.storagereview.com/guide2000/ ref/hdd/perf/raid/concepts/perfStripe.html>, Mar. 4, 2009, 2 pages.

Patterson, et al., "A Case for Redundant Arrays of Inexpensive Disks (RAID)", Proceedings of the 1988 ACM SIGMOD International Conference on Management of Data, retrieved at <<www.cs.cmu.edu/-garth/RAIDpaper/Patterson88.pdf>>, Jun. 1-3, 1988, pp. 109-116.

Rosenblum, et al., "The Design and Implementation of a Log-Structured File System", ACM Transactions on Computer Systems, retrieved at <www.cs.berkeley.edu/-brewer/cs262/LFS.pdf>, vol. 10, No. 1, Feb. 1992, pp. 26-52.

* cited by examiner

500

502
data that includes M data pages is stored as a stripe in a stripeset of a data store 504
a reference is generated for the stripe that includes an identifier for a storage device in which a first data page of the M data pages is stored and a vector that includes a page slot indicator for each of the M data pages

FIG. 5

SLIDING-WINDOW MULTI-CLASS STRIPING

This application is a divisional of allowed U.S. application Ser. No. 13/868,887, titled "Sliding-Window Multi-Class Striping," filed on Apr. 23, 2013, which is a divisional of U.S. application Ser. No. 12/426,783, titled "Sliding-Window Multi-Class Striping," filed on Apr. 20, 2009, now U.S. Pat. No. 8,799,572, issued on Aug. 5, 2014, both of which are incorporated by reference herein in their entireties.

BACKGROUND

Computer data storage refers to components, devices, and/or recording media used to retain digital data for periods of time. Various types of computer data storage exist, including memory devices (e.g., semiconductor storage), such as random access memory (RAM) devices and read only memory (ROM) devices, and mass storage devices, such as optical discs and magnetic storage (hard disks, magnetic tapes, etc.), and further types of storage.

A particular computer data storage implementation may be associated with a single computer or may be shared by multiple computers. For instance, a computer system that includes multiple computers may share a large persistent data store that is accessible over a storage network. The persistent data store may include a large number of independent storage units, including an array of hard disk drives and/or flash memory devices. Data may be stored in the data store in various ways. For instance, in one current technique for storing data, multipage units of data may be stored in a data store in the form of "stripes." A set of storage units that is used to store data stripes may be referred to as a "stripeset." "Stripesets" that store data in the form of "stripes" enable relatively high performance and high availability to stored data.

Allowing multiple computers to independently write stripes to a stripeset can be difficult to manage, however. For example, if pages of a stripe are written to different storage units independently, it may be difficult to ensure that pages from different stripes are written in the same order to all storage units of the stripeset. If stripes are permitted to be variable length, initial storage units of a stripeset may fill up faster than the last storage units of the stripeset. Furthermore, it may be difficult for the computers to determine an active stripeset at boot time. Still further, it is difficult to manage multiple independent stripesets.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A sequence of storage devices of a data store may include one or more stripesets for storing data stripes of different lengths and of different data types. Each data stripe may be stored in a prefix or other portion of a stripeset. Each data stripe may be identified by an array of addresses that identify each page of the data stripe on each included storage device. When a first storage device of a stripeset becomes full, the stripeset may be shifted by removing the full storage device from the stripeset, and adding a next storage device of the data store to the stripeset. A class variable may be associated with storage devices of a stripeset to identify the type of data that the stripeset can store. The class variable may be increased (or otherwise modified) when a computer stores data of a different class in the stripeset.

In a first implementation, a method is provided for identifying a data stripe. Data that includes M data pages is stored as a stripe in a stripeset of a data store. The stripeset includes N storage devices. A reference is generated for the stripe that includes an identifier and a vector. The identifier is an identifier for a storage device of the N storage devices in which a first data page of the M data pages is stored. The vector includes a page slot indicator for each of the M data pages. Each page slot indicator indicates for a corresponding data page of the M data pages a page slot of a storage device of the N storage devices in which the corresponding data page is stored.

The N storage devices of the stripeset may be associated in a logical sequence. The logical sequence includes a first storage device of the N storage devices at a logical first end of the stripeset and a second storage device of the N storage devices at a logical second end of the stripeset.

The first storage device in the logical sequence may be determined to be full. The first storage device may be removed from the stripeset. A next storage device of the data store may be added to the stripeset to be logically positioned at the logical second end of the stripeset adjacent to the second storage device.

In another implementation, another method is provided. A class variable is associated with a corresponding storage device of a data store. The data store includes a plurality of storage devices having associated class variables. Each class variable indicates a class or store status of the corresponding storage device. The class variable is enabled to be modified by a computer that stores a data page of a data stripe in the corresponding storage device. The class variable is enabled to be reset by a computer that erases data stored in the corresponding storage device.

For instance, a request may be received from the computer to store a data page in the storage device. The request may include a class indication. The data page is enabled to be stored in a next available page slot of the storage device if the class indication has a first relationship with the class variable associated with the storage device. The data page is enabled to be stored in a next available page slot of the storage device, and the class variable is enabled to be modified, if the class indication has a second relationship with the class variable. A response to the request is generated that includes the class variable if the class indication has a third relationship with the class variable.

In another implementation, a method for determining a stripeset in a plurality of storage devices in a data store is provided. The storage devices are associated in a logical sequence. The logical sequence includes a first storage device at a logical first end of the plurality of storage devices and a second storage device at a logical second end of the plurality of storage devices. A logically closest non-empty storage device of the plurality of storage devices to the logical first end is determined. An active storage device of the plurality of storage devices in a range of the logical sequence from the logically closest non-empty storage device to the logical second end is determined. A continuous range of active storage devices in the plurality of storage devices is determined that includes the determined active storage device.

In still another implementation, a method for storing a data stripe in a stripeset is provided. A first set of data pages to be stored in a first stripeset of a data store is provided. The first stripeset includes M storage devices. The M storage devices of the first stripeset are associated in a logical sequence that includes a first storage device of the M storage devices at a logical first end of the second stripeset and a second storage device of the M storage devices at a logical second end of the second stripeset. The first storage device is determined to be full. The first storage device is removed from the first stripeset. A third storage device of the data store is added to the first stripeset. The third storage device of the data store has an associated class variable that indicates a class of a second stripeset of the data store. The class variable is changed to indicate a class of the first stripeset. The first set of data pages is stored as a stripe in the first stripeset, including storing a data page of the first set of data pages in the third storage device.

Computer systems and computer program products (stored on a computer readable medium) are also described herein that are capable of performing and/or enabling the methods described above and elsewhere herein, and for implementing further embodiments as described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 5 shows a flowchart providing a process for storing data in a stripeset, according to an example embodiment of the present invention.

Figures 18, 19:
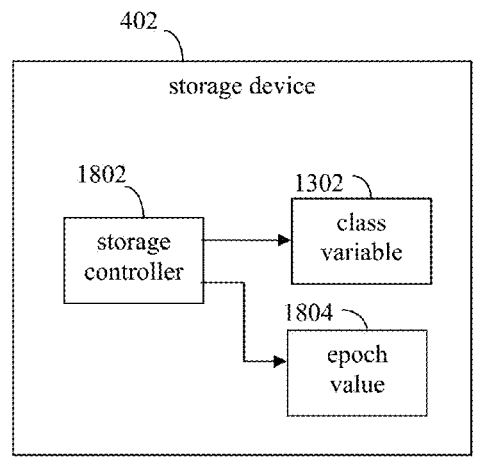
FIG. 18 shows a block diagram of a storage device, according to an example embodiment of the present invention.
FIG. 19 shows a flowchart providing a process for determining an active stripeset, according to an example embodiment of the present invention.
Figure 22:
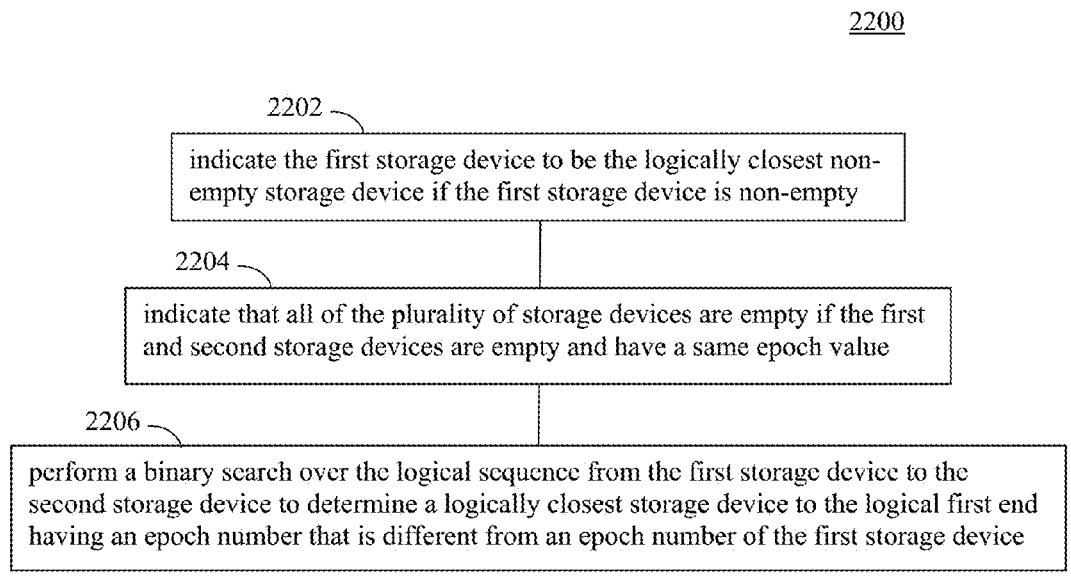
Figure 24:
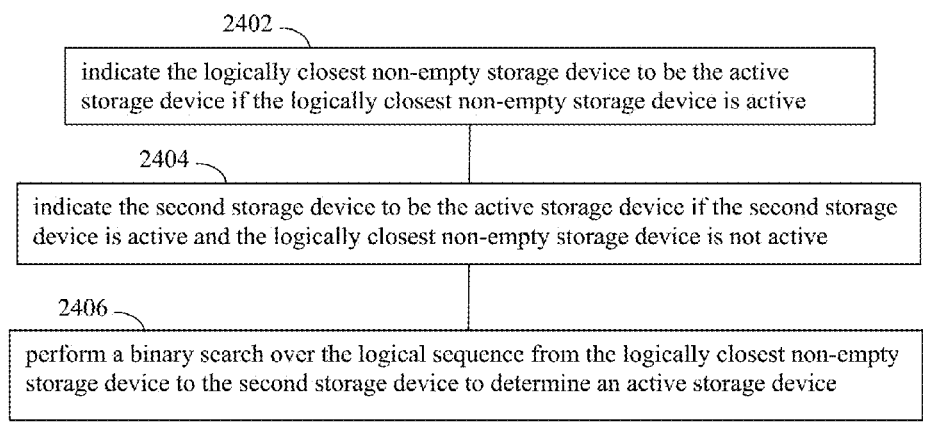
Figure 25:
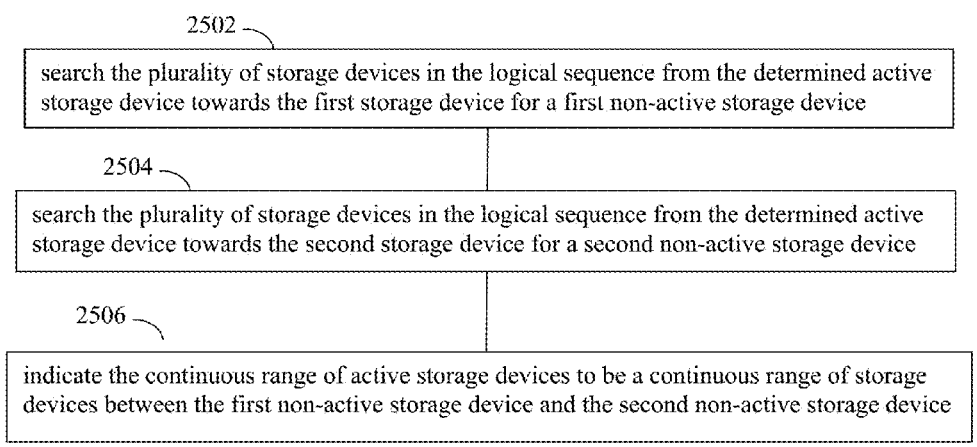

FIGS. 22, 24, and 25 shows flowcharts providing processes for performing the flowchart of FIG. 19, according to example embodiments of the present invention.

Figure 23:
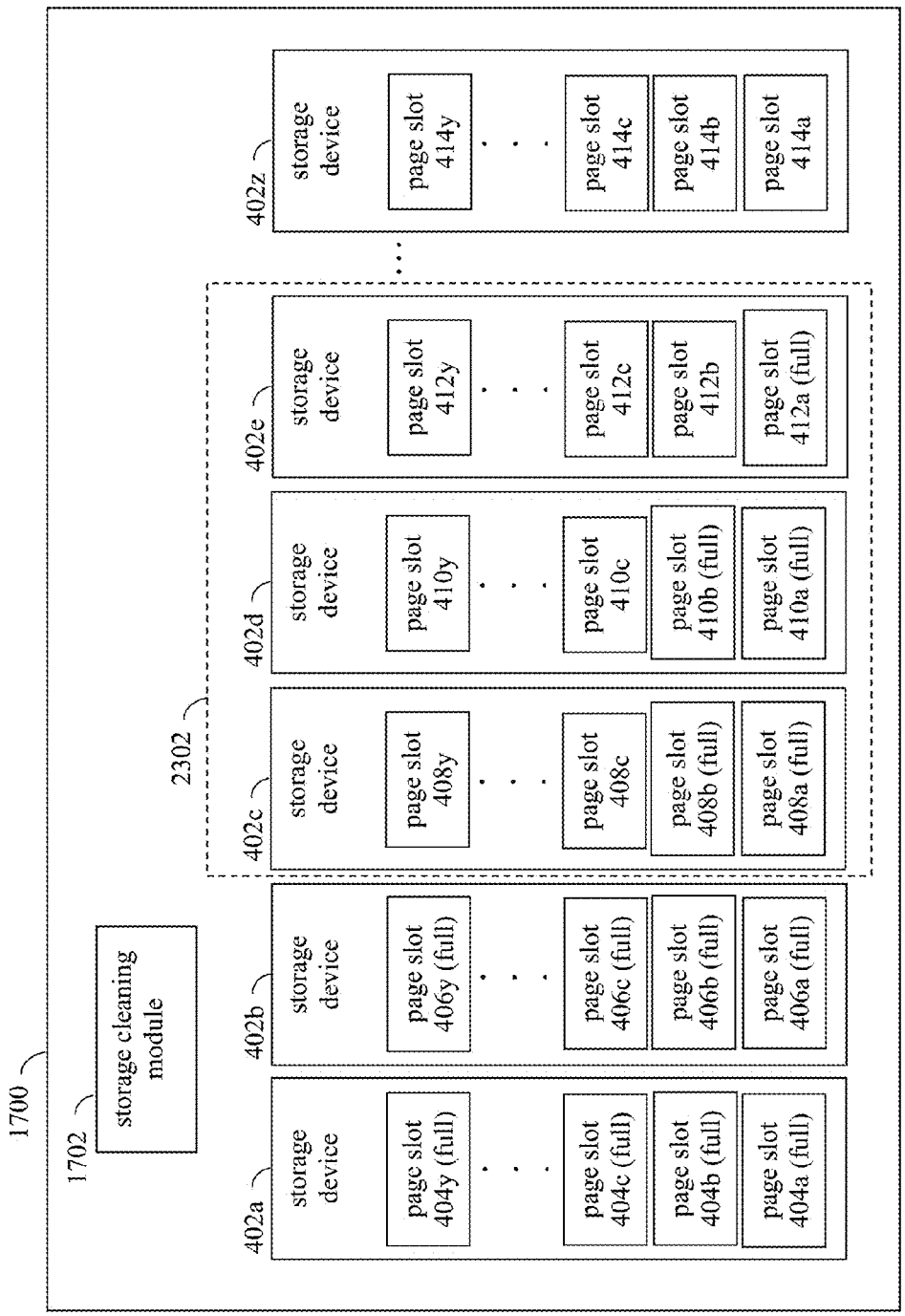

FIG. 23 shows a block diagram of a data store, according to an example embodiment of the present invention.

Figure 26:
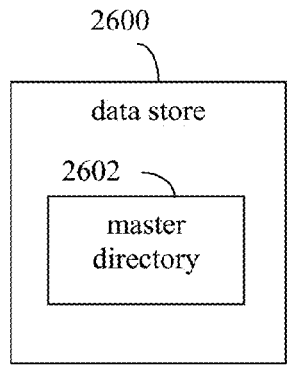

FIG. 26 shows a block diagram of a data store that maintains a master directory, according to an example embodiment of the present invention.

Figure 27:
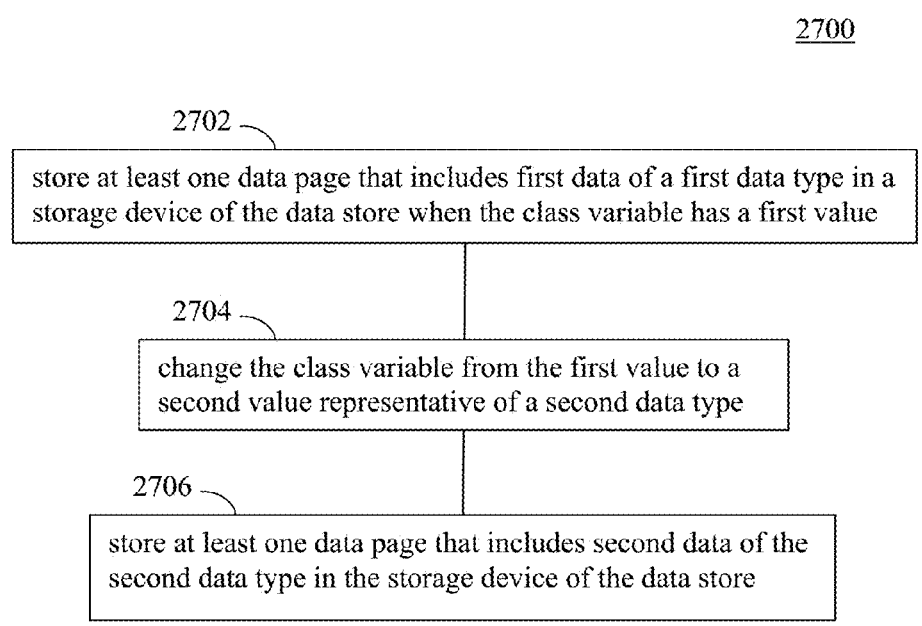

FIG. 27 shows a flowchart providing a process for generating a multiclass stripeset, according to an example embodiment of the present invention.

Figure 28:
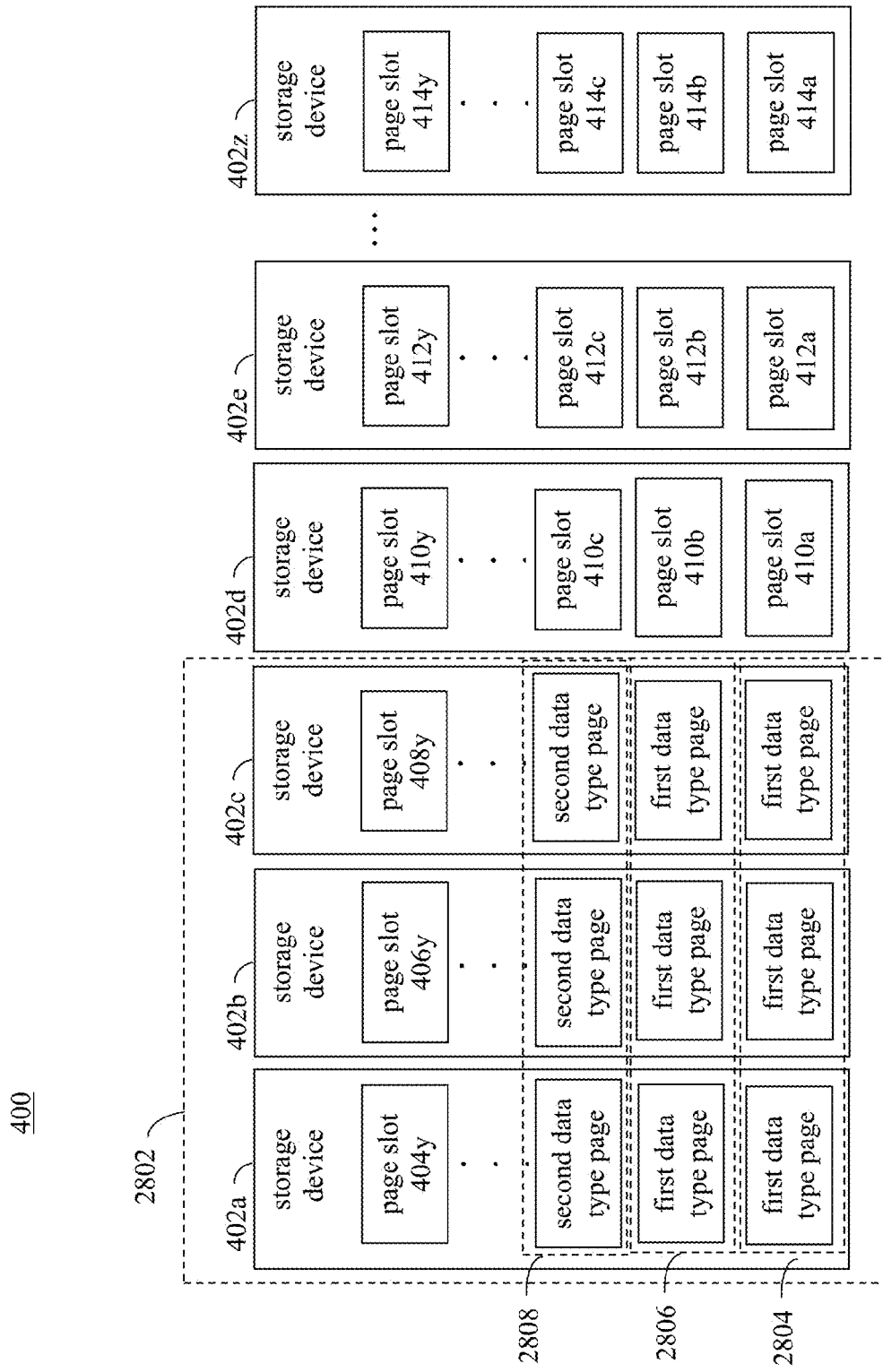

FIG. 28 shows a block diagram of a data store, according to an example embodiment of the present invention.

Figure 29:
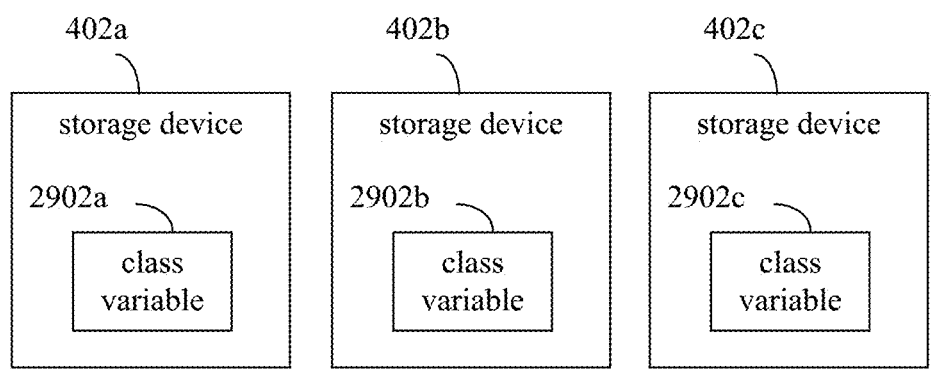

FIG. 29 shows a block diagram of storage devices having associated class variables, according to an example embodiment of the present invention.

Figure 30:
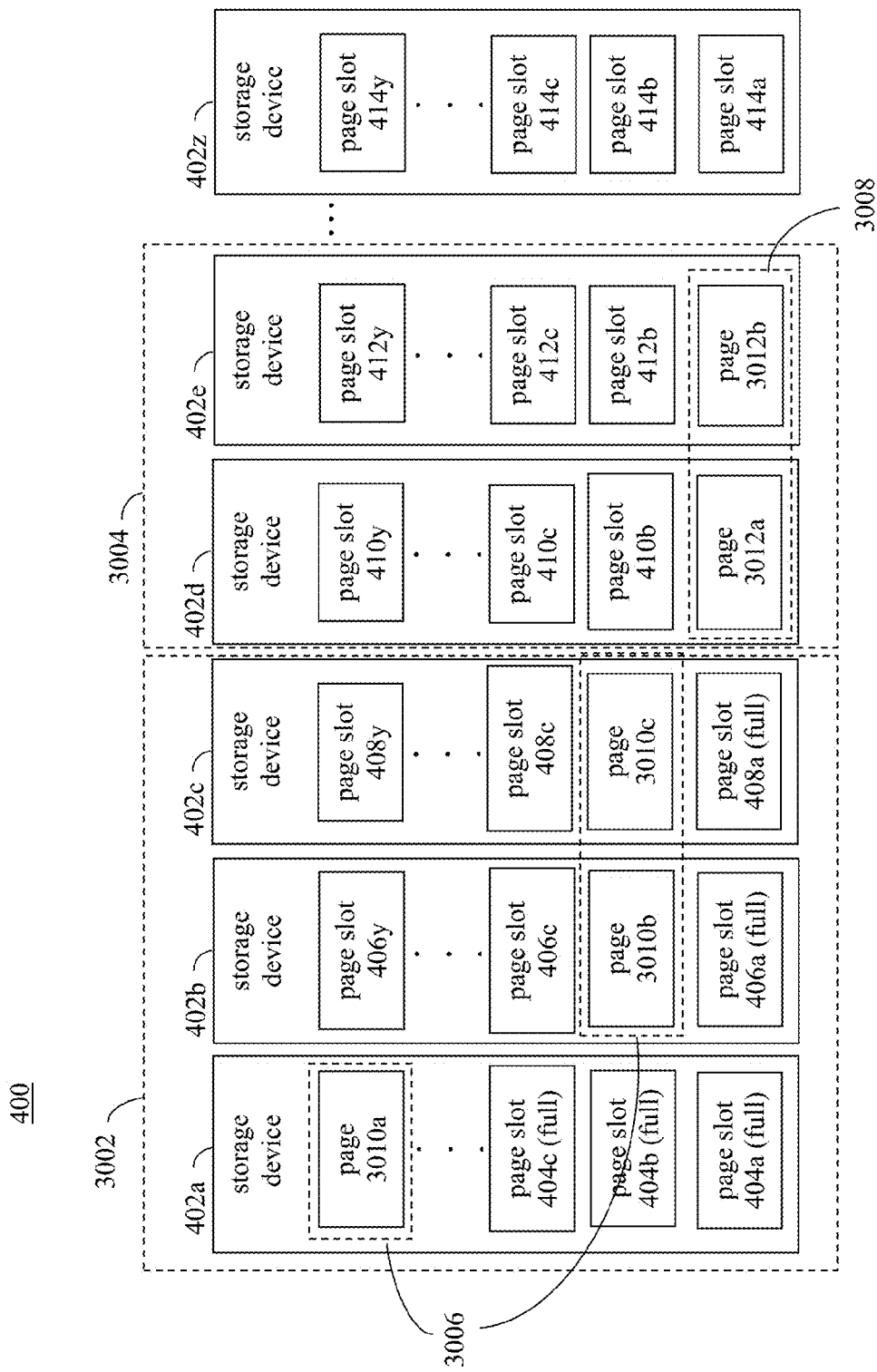
Figure 32:
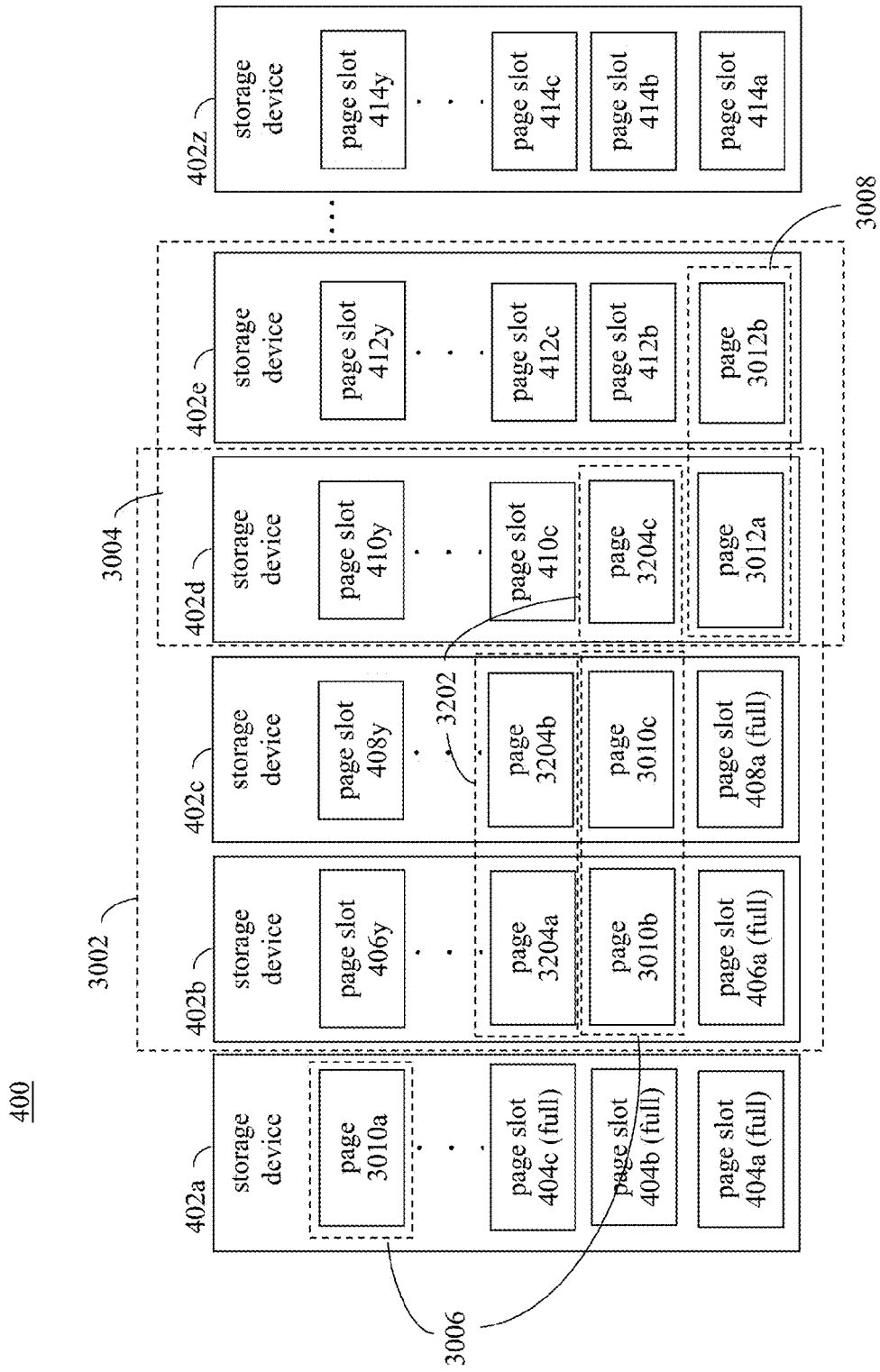

FIGS. 30 and 32 show block diagrams of a data store that includes multiple stripesets that can slide and can overlap to form multiclass stripesets, according to example embodiments of the present invention.

Figure 31:
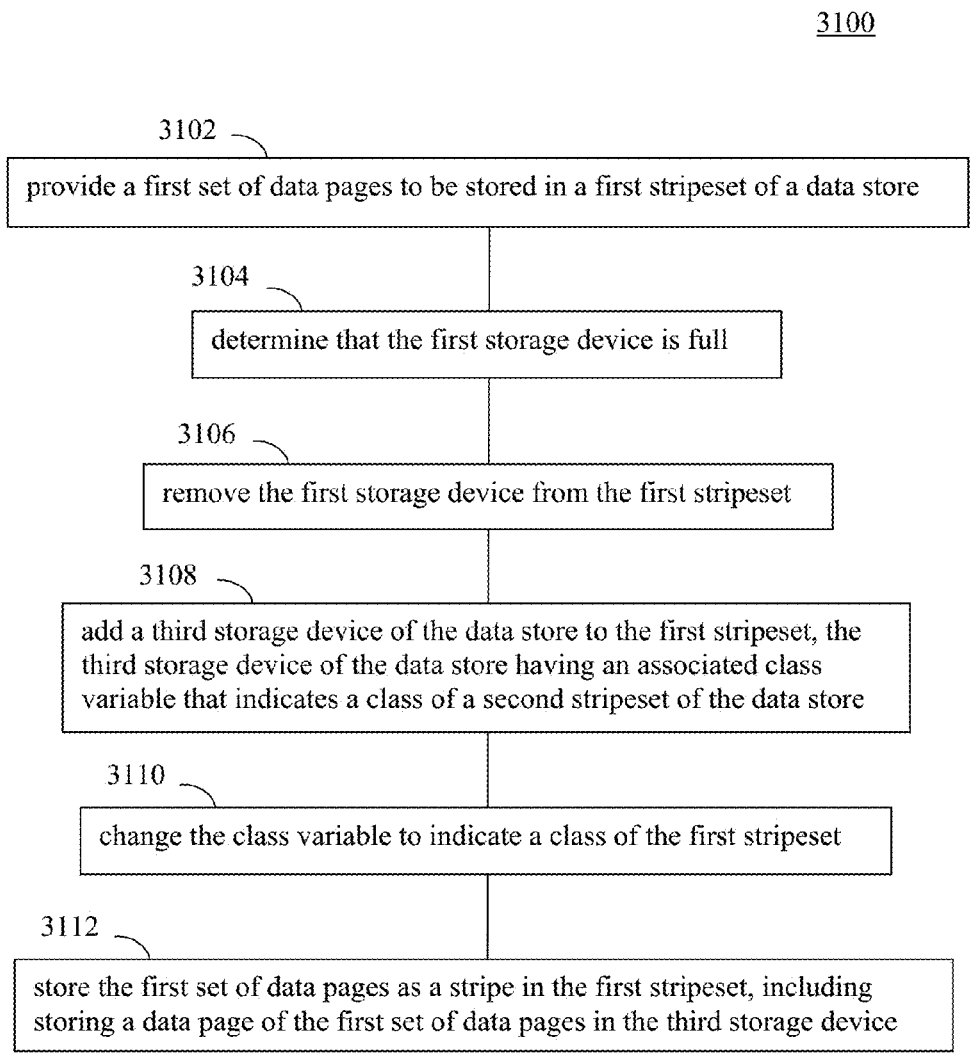

FIG. 31 shows a flowchart providing a process for storing a data stripe and sliding a stripeset, according to an example embodiment of the present invention.

Figure 33:
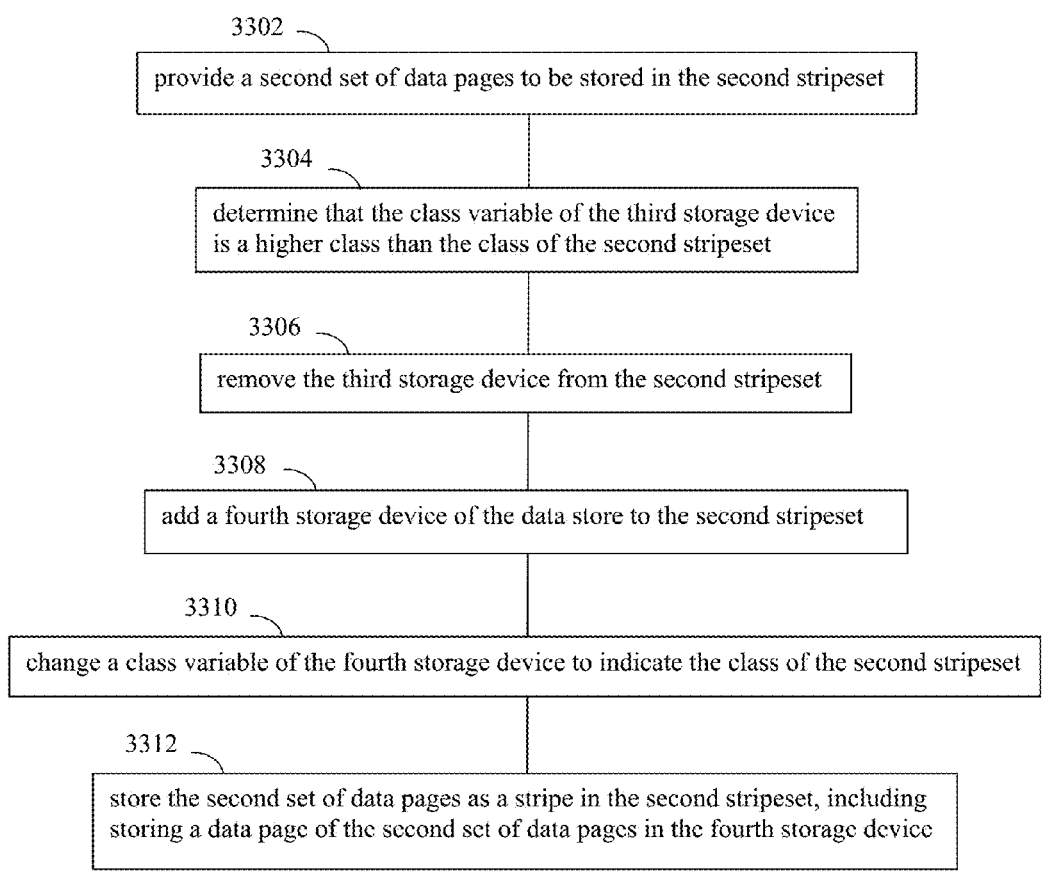

FIG. 33 shows a flowchart providing a process for storing a data stripe and sliding a stripeset, according to an example embodiment of the present invention.

Figure 34:
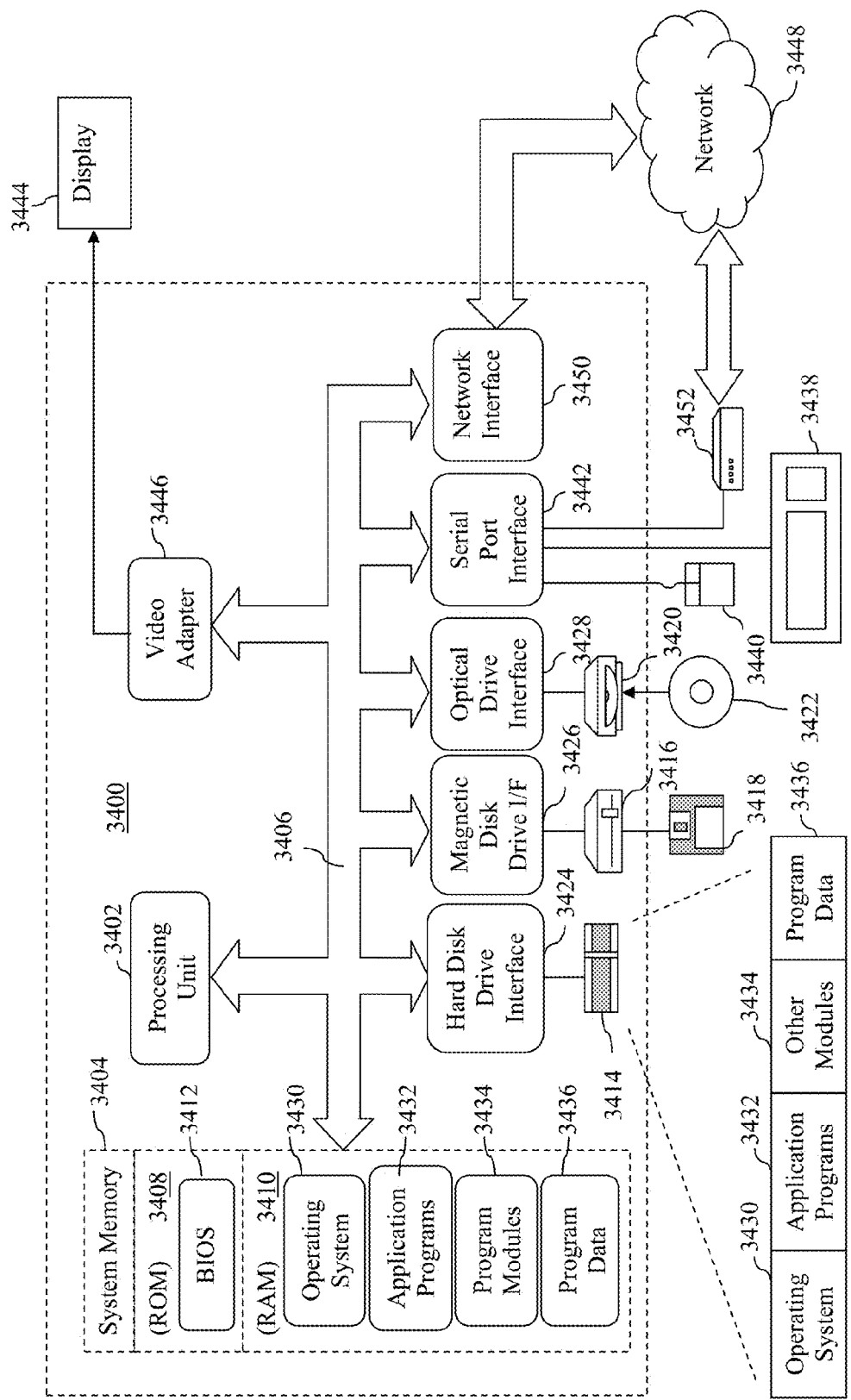

FIG. 34 shows a block diagram of an example computer that may be used to implement embodiments of the present invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

II. Data Storage Systems

Figure 1:
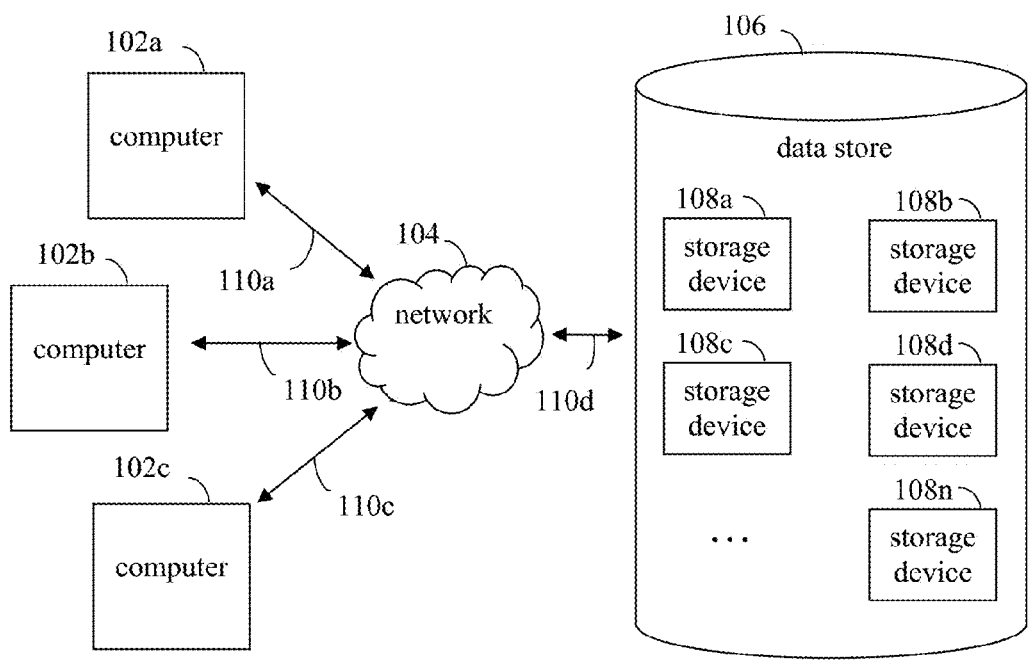
FIG. 1 shows a computing and data storage system in which a plurality of computing devices access shared storage.

Embodiments of the present invention relate to techniques for storing data and accessing data stored in computer data storage. Computer data storage refers to components, devices, and/or recording media used to store digital data. A particular computer data storage implementation may be accessed by a single computer or may be shared by multiple computers. For example, FIG. 1 shows a computing and data storage system 100 in which a plurality of computing devices access shared storage. As shown in FIG. 1, system 100 includes first-third computers 102a-102c, a communication network 104, and a data store 106. Data store 106 includes a plurality of storage units/storage devices 108a-108n. In the example of FIG. 1, first-third computers 102a-102c share data store 106, including being enabled to store data in, and to access data stored in storage devices 108a-108n of data store 106 (through network 104).

Although three computers 102a-102c are shown in FIG. 1, any number of computers 102 may be coupled to network 100 to share data store 106, include hundreds, thousands, or even further numbers of computing devices. Examples of computers 102 include stationary and mobile computing devices. For example, each of computers 102a-102c may be a desktop computer (e.g., a personal computer), a mobile computer (e.g., a personal digital assistant (PDA), a laptop computer, a notebook computer, a smart phone, etc.), or other type of computing device.

Each of computers 102a-102c is shown in FIG. 1 as communicating with data store 106 through network 104 and a corresponding communication link. For example, as shown in FIG. 1, computer 102a is communicatively coupled with network 104 through a first communication link 110a, computer 102b is communicatively coupled with network 104 through a second communication link 110b, and computer 102c is communicatively coupled with network 104 through a third communication link 110c. Data store 106 is shown communicatively coupled with network 104 through a fourth communication link 110d. Network 104 may be a LAN, WAN (wide area network), or combination of networks, such as the Internet. First-fourth communication links 110a-110d may include any type or combination of communication links, including wired and/or wireless links, such as IEEE 802.11 wireless LAN (WLAN) wireless links, Worldwide Interoperability for Microwave Access (Wi-MAX) links, cellular network links, wireless personal area network (PAN) links (e.g., Bluetooth™ links), Ethernet links, USB links, etc.

Data store 106 may include storage devices 108a in any configuration, including as an array. Although storage devices 108a-108n are shown in FIG. 1, any number of storage devices 108 may be included in data store 106 to store data, include hundreds, thousands, or even further numbers of storage devices.

Data may be stored in data store 106 in various ways. For instance, in one current technique for storing data, multipage sets of data may be stored in data store 106 in the form of "stripes." A "stripe" is a multipage set of data that may be stored in storage in a single operation, where each data page is written to a different storage device. Furthermore, a data stripe may be read from storage in a single operation. Each page of the multipage set of data is stored in a corresponding storage device, to form a "stripe" of the data across the storage devices. Each storage device may have multiple slots for storing data pages, including hundreds, thousands, millions, or even greater numbers of data pages, and thus may include pages from various numbers of stripes. A set of storage devices of data store 106 that is used to store a stripe may be referred to as a "stripeset." A "stripeset" may include any number of storage devices to store a corresponding number of pages of data for each stripe, including hundred, thousands, or even greater numbers of storage devices. The number of storage devices included in a stripeset, corresponding to the maximum number of pages for a set of data that may be stored in the stripeset, may be referred to as the "rank" of the stripeset.

Figure 2:
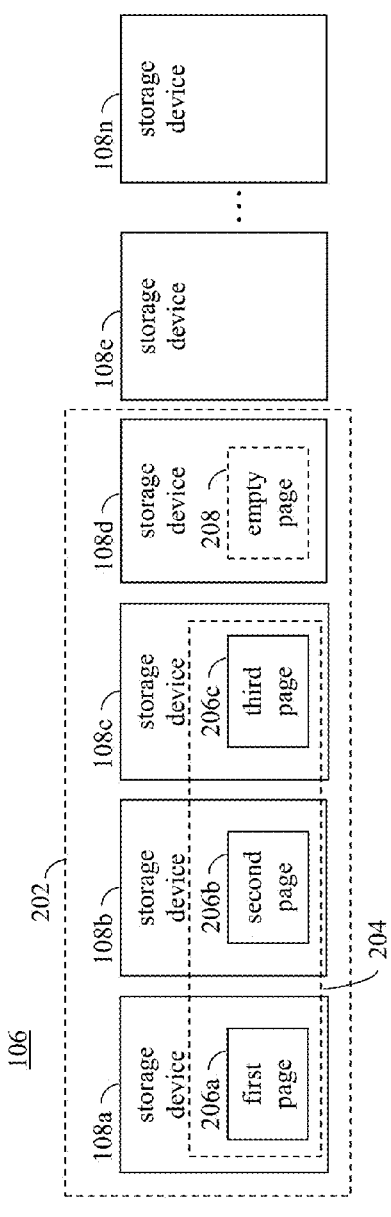
FIGS. 2 and 3 show example storage devices of a data store that store data in the form of data stripes.

For example, FIG. 2 shows storage devices 108a-108n of data store 106 storing data in the form of a stripe. As shown in FIG. 2, a first stripe 204 representing data that includes three data pages 206a-206c is stored in data store 106. In FIG. 2, storage devices 108a-108d are currently a portion of data store 106 allocated for storing data in the form of stripes, and thus form a stripeset 202. Because in the current example, stripeset 202 includes four storage devices 108a-108d, stripes including four or less pages of data may be stored in stripeset 202. Storage devices 108e-108n are not included in stripeset 202. As shown in FIG. 2, stripeset 202 stores first stripe 204. First page 206a of first stripe 204 is stored in storage device 108a, second page 206b of first stripe 204 is stored in storage device 108b, and third page 206c of first stripe 204 is stored in storage device 108c. Because first stripe 204 includes three data pages, no data of first stripe 204 is stored in fourth storage device 108d of stripeset 202, and an empty page 208 is indicated in a first page slot of storage device 108d corresponding to first stripe 204.

"Stripesets" that store data in the form of "stripes" enable relatively high performance and high availability to stored data in data store 106. Furthermore, stripesets enable greater data security, storing data across multiple storage devices rather than a single storage device in which a single point of failure may lead to loss of all stored data. If one of storage devices 108a-108d of stripeset 202 fails, the data of the failing storage device may be recovered according to an error correction technique, depending on the particular implementation.

Figure 3:
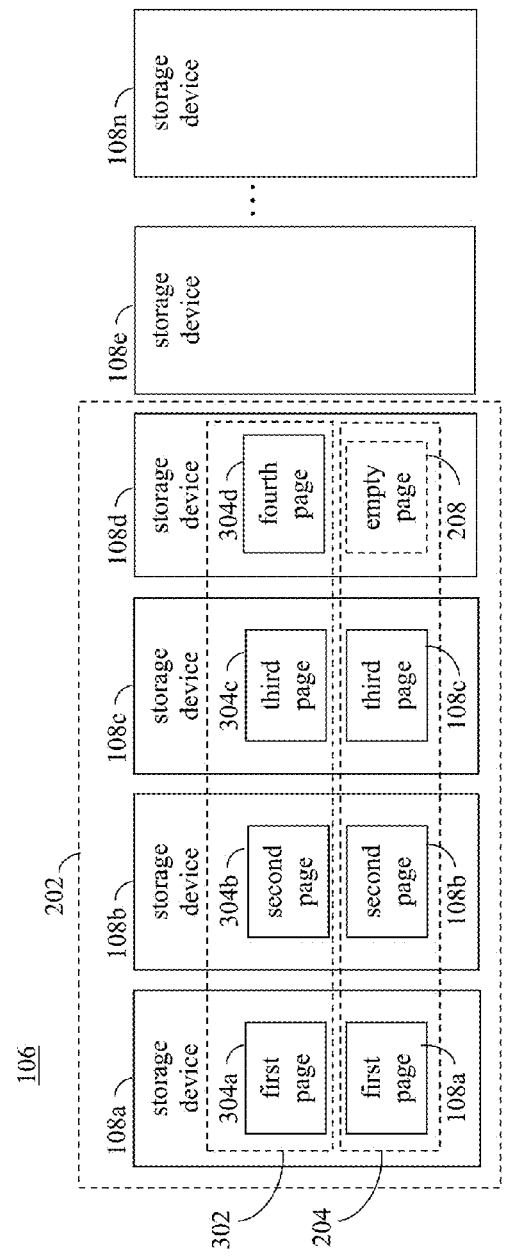

Allowing multiple computers, such as computers 102a-102c shown in FIG. 1, to independently write stripes to a stripeset, such as stripeset 202 in FIG. 2, can be difficult to manage, however. For example, it may be important that pages from different stripes, including pages 206a-206c of stripe 204, are written to storage devices 108a-108c in a same order so that pages of the stripes do not become intermixed. Furthermore, if stripes are permitted to be variable length, initial storage units of a stripeset may fill up faster than the last storage units of the stripeset, resulting in inefficient use of storage. For example, FIG. 3 shows data store 106 of FIG. 2, with a second set of data stored in stripeset 202 as a second stripe 302. Second stripe 302 includes four data pages, first-fourth data pages 304a-304d. As shown in FIG. 3, first page 304a of second stripe 302 is stored in storage device 108a, second page 304b of second stripe 302 is stored in storage device 108b, third page 304c of second stripe 302 is stored in storage device 108c, and fourth page 304d of second stripe 302 is stored in storage device 108d. As shown in FIG. 3, due to the different page lengths of first and second stripes 204 and 302, first-third storage devices 108a-108c are filling up faster than storage device 108d.

Furthermore, it may be difficult for computers 102a-102c to determine the location of an active stripeset in data store 106 (e.g., which of storage devices 108a-108n include stripeset 202) at boot time. Still further, if multiple independent stripesets may simultaneously be present in data store 106 to store different types of data (e.g., binary large objects, indexes, logs, etc.), it may be difficult to manage the multiple stripesets.

Embodiments of the present invention overcome such deficiencies in conventional data storage systems. Examples of such embodiments are described below.

III. Example Embodiments

The example embodiments described herein are provided for illustrative purposes, and are not limiting. Furthermore, additional structural and operational embodiments, including modifications/alterations, will become apparent to persons skilled in the relevant art(s) from the teachings herein.

Embodiments relate to shared storage systems, where many computers may share one pool of storage devices. In such a system, multiple computers may be reading from and writing to storage devices independently. It is complex and expensive for the computers to synchronize their views of the state of all of the storage devices. It is also undesirable for all of the computers to funnel their read and/or write operations through a single computer that functions as a storage server, because such a configuration may limit scalability of the system. Embodiments described herein overcome these limitations, including enabling multiple computer to read and write to a common pool of storage independently, without the computers needing to synchronize their views of the state of the storage devices.

In an embodiment, store operations are made with respect to storage devices in a data store that are configured for "append" operations and "erase" operations. With regard to an append operation, a storage device identifier and a data page are received (e.g., from a computer 102 of FIG. 1) as an input to a storage device, a page of data is stored in the storage device, and an address of a page slot in the storage device where the page is stored is returned (e.g., to computer 102). With regard to an erase operation, an erase command is received (e.g., from a computer 102 of FIG. 1) as an input to a storage device, and in response, the storage device erases the data contents of the storage device. After executing an erase operation on a storage device, a next append operation performed at the storage device stores a received page of data in the "first" page slot of the storage device. The append and erase operations may be implemented by each device that manages storage devices. For example, a controller configured to implement append and erase operations may be incorporated in each storage device, or for a group of storage devices. However, other implementations are possible, such as implementing append and erase operations in a front-end server that manages a group of storage devices.

Figure 4:
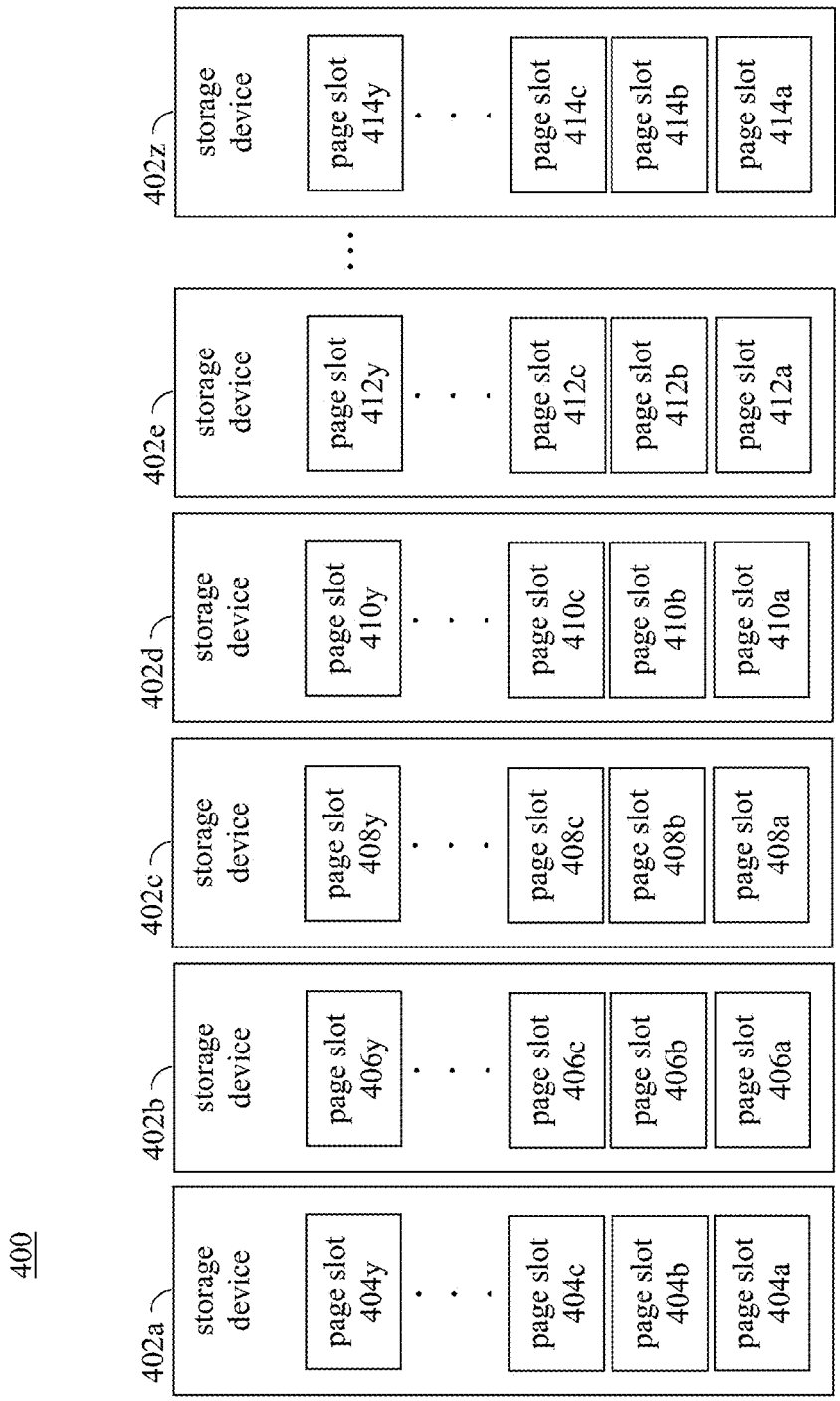
FIG. 4 shows a block diagram of a data store, according to example embodiment of the present invention.

FIG. 4 shows a block diagram of a data store 400, according to an example embodiment. Computers 102 shown in FIG. 1 may communicate with data store 400 (e.g., through network 104) to store data and access data stored in data store 400, for example. As shown in FIG. 4, data store 400 includes storage devices 402a-402z. Any number of storage devices 402 may be included in data store 400, including numbers in the ones, tens, hundreds, thousands, and even greater numbers of storage devices. Storage devices 402a-402z are configured to process append and erase operations, as described above. In an embodiment, storage devices 402a-402z may be append-only storage devices, meaning that storage devices 402a-402z are only configured to perform append and erase operations (e.g., are not configured to perform further types of storage-related operations), but in other embodiments storage devices 402a-402z may be configured to perform further storage-related operations.

As shown in FIG. 4, each of storage devices 402a-402z includes a sequence of page slots. For example, storage device 402a includes page slots 404a-404y, storage device 402b includes page slots 406a-406y, storage device 402c includes page slots 408a-408y, storage device 402d includes page slots 410a-410y, etc. Any number of page slots may be included in each storage device 402, including numbers in the ones, tens, hundreds, thousands, and even greater numbers of page slots. Each page slot may store one page of data of a corresponding data stripe, for example. Furthermore, a portion or all of storage devices 402a-402z may be included in one or more stripesets included in data store 400.

Storage devices 402a-402z may be arranged or associated in data store 400 in any configuration, including as an array, in a storage area network (SAN), etc. A storage device 402 may be any type of storage device, volatile and/or non-volatile, including a memory device and/or a mass storage device. Examples of storage devices 402 include memory devices (e.g., semiconductor storage), such as random access memory (RAM) devices (volatile or non-volatile), and read only memory (ROM) devices, and mass storage devices, such as optical discs and magnetic storage (hard disks, magnetic tapes, etc.), and further types of storage. Storage devices 402 may include memory devices (e.g., flash memory devices) when faster data access is desired, and/or mass storage devices may be present when greater storage capacity is desired. A storage device, as defined herein, may also be referred to as a "segment" or a "storage segment."

The following subsections describe example embodiments for storing of data stripes received from computers, such as computers 102 of FIG. 1, in data store 400 in the form of data stripes.

A. Example Embodiments for Storing Stripes

An example striping system may support three operations, referred to as "get-stripeset," "store-stripe," and "get-stripe." A "get-stripeset" operation returns a stripeset reference, which identifies a set of storage devices where a stripe can be written. The number of storage devices that are included in a stripeset is the "rank" of the stripeset. A "store-stripe" operation takes a stripeset reference and a main-memory reference to some data to be stored and returns a stripe reference that tells where the data was stored. If there is no more space in the stripeset, then it returns a new stripeset reference in addition to the stripe reference. A "get-stripe" operation takes a stripe reference as input and returns the data in the stripe that is identified by that stripe reference. Such operations may be transmitted as commands to storage devices of a data store by requesting devices, such as computers 102 shown in FIG. 1.

A conventional approach to storing stripes in a stripeset is to require that all stripes have the same number of pages and that all pages of a stripe are stored at the same page slot offset in each storage device forming the stripeset. For example, referring to FIG. 3, stripeset 202 has a rank of four. In such case, four storage devices 108a-108d are included in stripeset 202, and each stripe has four pages. A "stripe reference" that identifies first stripe 204 stored in stripeset 202 may have a value of one, and each data page stored in storage devices 108a-108d is stored at an offset of one in storage devices 108a-108d. A stripe reference that identifies second stripe 302 stored in stripeset 202 may have a value of two, and each data page of second stripe 302 stored in stripeset 202 is stored at an offset of two in storage devices 108a-108d. Due to this conventional addressing scheme, even if a data stripe to be written into stripeset 202 includes less than four pages, four data pages of storage devices 108a-108d are dedicated to the stripe. For example, even though the data corresponding to first stripe 204 included three data pages, which are stored in storage devices 108a-108c, an empty page 208 of storage device 108d is included in first stripe 204. Thus, some storage devices of data store 106 may include empty data pages when stripes stored in stripeset 202 have a length that is less than a rank of stripeset 202, which is an inefficient use of storage capacity of data store 106.

In an embodiment, data stripes may be stored in storage in a manner that does not result in storage devices having empty data pages when storing stripes having lengths less than a rank of a stripeset. For instance, FIG. 5 shows a flowchart 500 providing a process for storing data in a stripeset, according to an example embodiment. In an embodiment, flowchart 500 may be performed by data store 400 shown in FIG. 4. Other structural and operational embodiments will be apparent to persons skilled in the relevant art(s) based on the discussion regarding flowchart 500. Flowchart 500 is described as follows.

Figure 6:
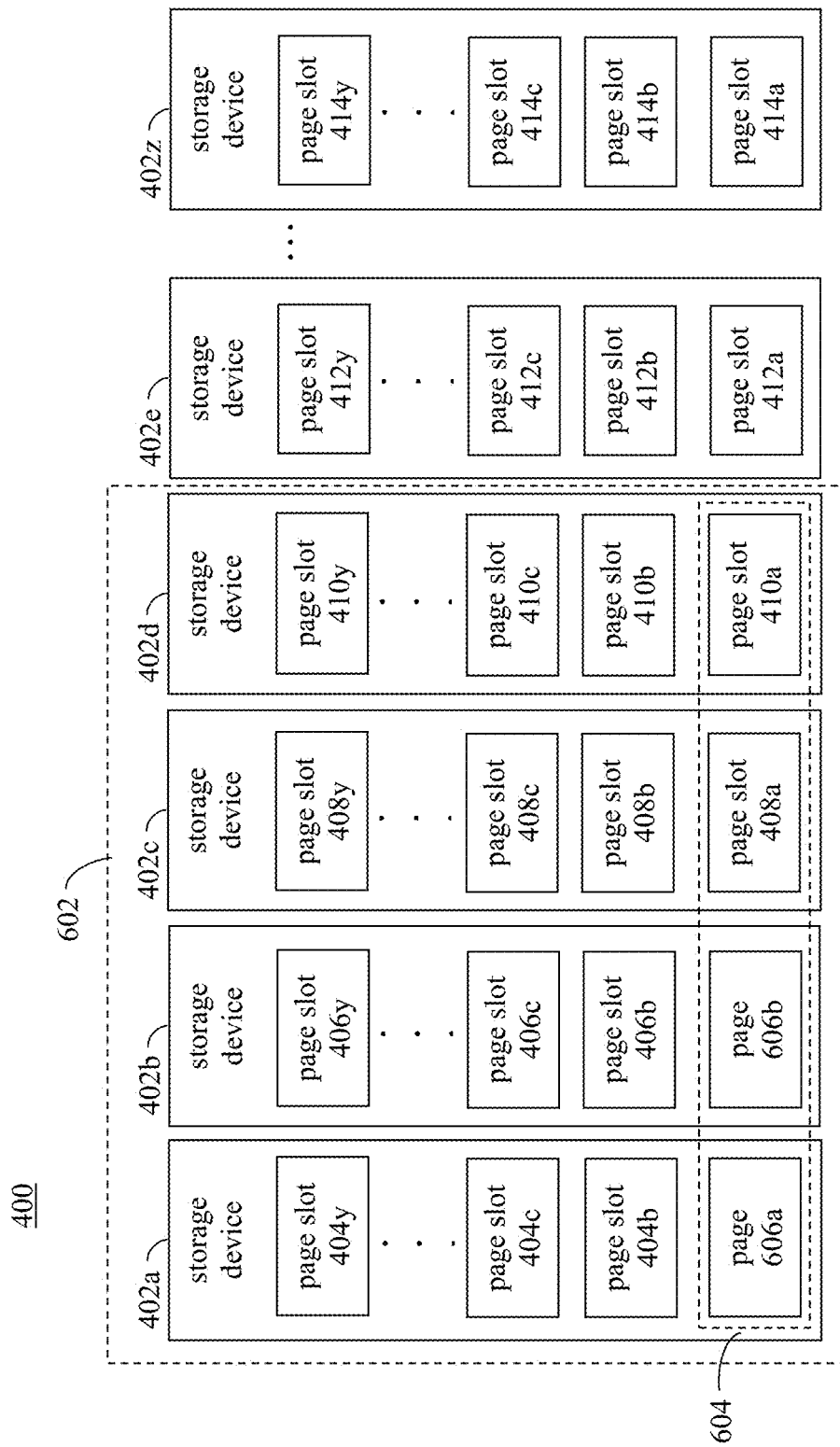
FIGS. 6 and 7 show views of the data store of FIG. 4 storing data stripes, according to example embodiments of the present invention.

As shown in FIG. 5, flowchart 500 begins with step 502. In step 502, data that includes M data pages is stored as a stripe in a stripeset of a data store. In an embodiment, data pages of a set of data may be stored in a subset of a stripeset. For instance, a stripe that includes M pages may be stored in a stripeset of N storage devices, where N>M. The stripe is written to a subsequence of the M storage devices of the stripeset. For instance, FIG. 6 shows a block diagram of data store 400 of FIG. 4, according to an example embodiment. In the example of FIG. 6, a stripeset 602 is present in data store 400 of rank four (N=4), which includes storage devices 402a-402d. A first stripe 604 is stored in stripeset 602 that includes two data pages, a first data page 606a and a second data page 606b (M=2). In the example of FIG. 6 data pages 606a and 606b are stored in page slots 404a and 406a of storage devices 402a and 402b, respectively. However, data pages 606a and 606b may be alternatively stored in page slots 406a and 408a of storage devices 402b and 402c, respectively, or in page slots 408a and 410a of storage devices 402c and 402d, respectively. In embodiments, first stripe 604 does not consume space on storage devices of data store 602 where first stripe 604 is not written. For example, first stripe 604, when stored in storage devices 402a and 402b, does not consume space on storage devices 402c and 402d. That is, for this case, first page slots 408a and 410a of storage devices 402c and 402d are still available to store other data.

In step 504, a reference is generated for the stripe that includes an identifier for a storage device of the N storage devices in which a first data page of the M data pages is stored and a vector that includes a page slot indicator for each of the M data pages. In an embodiment, data store 400 generates a stripe reference for each stripe stored in stripeset 602. The stripe reference includes an identifier for the one of storage devices 402a-402d in which a first data page of the data stripe is stored, and includes a vector that includes a page slot indicator for each of the M data pages of the stripe. Each page slot indicator indicates for a corresponding data page of the M data pages a page slot of a storage device 402 of the N storage devices of stripeset 602 in which the corresponding data page is stored.

For example, referring to FIG. 6, first stripe 604 may have a stripe reference generated that includes an identifier for storage device 402a, which is the storage device storing first data page 606a of stripe 604, and a vector indicating page slots 404a and 406a, which are page slots of storage devices 402a and 402b, which store pages 606a and 606b of first stripe 604. Storage device 402a may be identified in any manner, including by a storage device ID. For instance, each of storage devices 402a-402z may be assigned a corresponding storage device ID, which may be a number that identifies each of storage devices 402a-402z in a sequence in which they are associated in data store 400 (e.g., data store 400 may include a thousand storage devices 402, which are assigned identifiers 1-1000, respectively, in sequence). Likewise, page slots 404a and 404b may be identified in any manner, including by a page slot ID. For instance, page slots of a particular storage device, such as page slots 404a-404y of storage device 402a, may be assigned a corresponding number or other identifier that identifies each page slot 404 in a sequence in which they are stored in storage device 402a. For example, a thousand page slots 404 in storage device 402a may be assigned identifiers 1-1000, respectively. Thus, in an embodiment, a stripe reference generated for first stripe 604 may have the form of an identifier of "1" for storage device 402a, and a vector of [1, 1], identifying page slots 404a and 406a of storage devices 402a and 402b that store pages 606a and 606b of first stripe 604.

Figure 7:
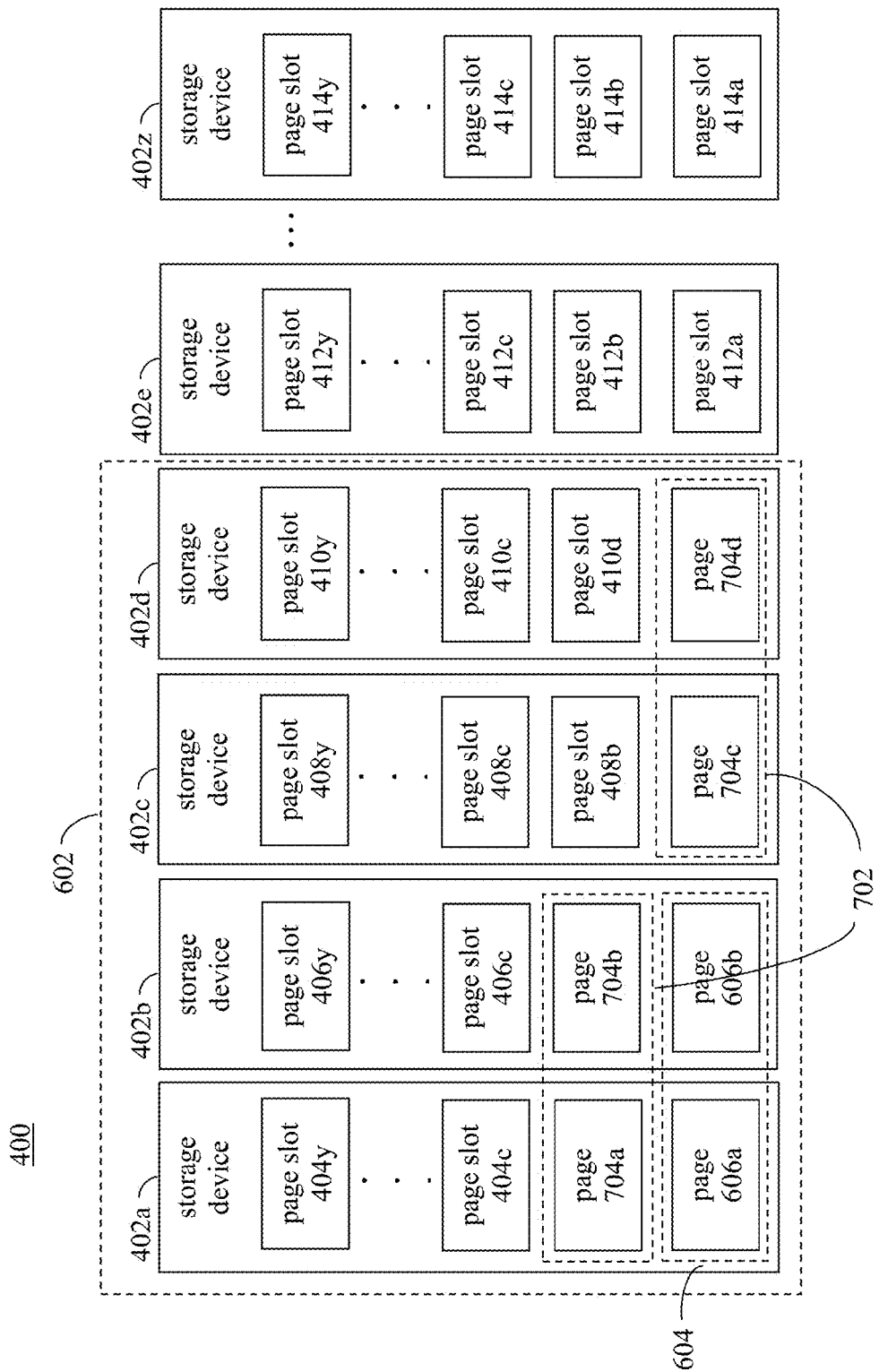

As shown in FIG. 7, a second stripe 702 may be stored in stripeset 602 in addition to first stripe 604, according to step 502 of flowchart 500. In the example of FIG. 7, second stripe 702 includes four data pages, first-fourth data page 704a-704d (M=4). In the example of FIG. 7 data pages 704a-704d are stored in page slots 404b, 406b, 408a, and 410a of storage devices 402a-402d, respectively. This is in contrast to a conventional approach, where data pages 704a-704d would be stored in the second page slot of each of storage devices 402a-402d (page slots 404b, 406b, 408b, and 410b) even though pages slots 408a and 408b were empty, leading to an inefficient utilization of storage space.

According to step 504 of flowchart 500, a stripe reference may be generated for second stripe 702. In an embodiment, the stripe reference generated for second stripe 702 may be an identifier of "1" for storage device 402a, and a vector of [2, 2, 1, 1], identifying page slots 404b, 406b, 408a, and 410a as storing pages 704a-704d of second stripe 702, respectively.

Note that in further embodiments, the stripe reference generated in step 504 may have other forms. For example, in an embodiment, the stripe reference may include a vector that includes a storage device identifier and a page slot indicator pair for each of the M data pages. Such an embodiment may be useful when data pages are stored in non-sequential storage devices. For example, instead of storing first-fourth data pages 704a-704d of second stripe 702 in page slots 404b, 406b, 408a, and 410a of storage devices 402a-402d, respectively, first-fourth data pages 704a-704d may be stored in a non-sequential string of storage devices, such as being stored in page slots 404b, 406b, 410a, and 412a of storage devices 402a, 402b, 402d, and 402e, respectively. In such case, a stripe reference generated for second stripe 702 may be a vector of [(1, 2), (2, 2), (4, 1), (5, 1)], identifying page slots 404*b*, 406*b*, 410*a*, and 412*a* as storing pages 704*a*-704*d* of second stripe 702, respectively.

The reference that is generated for first stripe 604 may be returned (e.g., transmitted from data store 400) to the device (e.g., one of computers 102 in FIG. 1) performing a store operation at data store 400, after the store operation is completed. Similarly, the reference that is generated for second stripe 702 may be returned to the device performing a store operation for second stripe 702 at data store 400, after the store operation is completed. The references may be later used by devices (e.g., one of computers 102 in FIG. 1) to access first and second data stripes 604 and 702 in data store 602.

Figure 8:
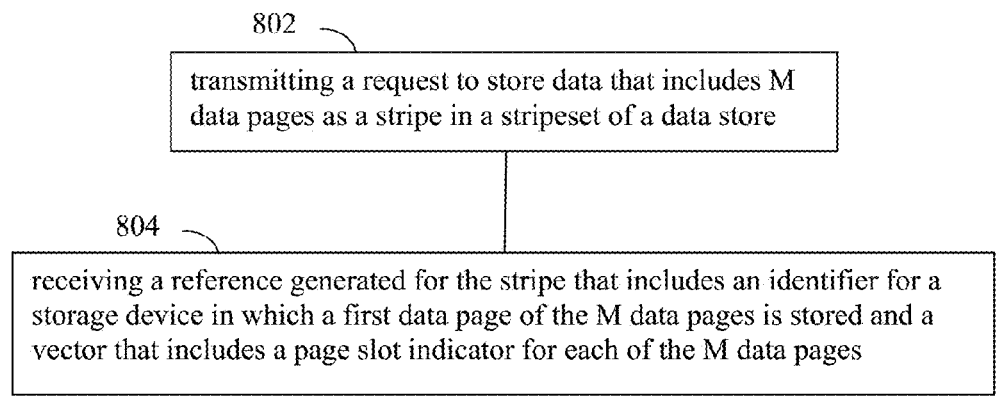
FIG. 8 shows a flowchart for storing a data stripe, according to an example embodiment of the present invention.

Thus, in an example, the device may perform a flowchart 800 shown in FIG. 8. In step 802, a request is transmitted to store data that includes M data pages as a stripe in a stripeset of a data store. For example, referring to FIG. 1, computer 102*a* may transmit a store request (e.g., an append operation) through network 104 to data store 400 (FIG. 4) to store first stripe 604 in data store 400. In step 804, a reference generated for the stripe is received that includes an identifier for a storage device in which a first data page of the M data pages is stored and a vector that includes a page slot indicator for each of the M data pages. For example, referring to FIG. 1, computer 102*a* may receive a response from data store 400 indicating that first stripe 604 was stored in data store 400, including the stripe reference of an identifier of "1" for storage device 402*a*, and a vector of [1, 1], identifying page slots 404*a* and 404*b* that store pages 606*a* and 606*b* of first stripe 604. In a similar fashion, computer 102*a* (or other computer 102) may transmit a store request to data store 400, and receive a response from data store 400 regarding second stripe 702, according to flowchart 800.

Figure 9:
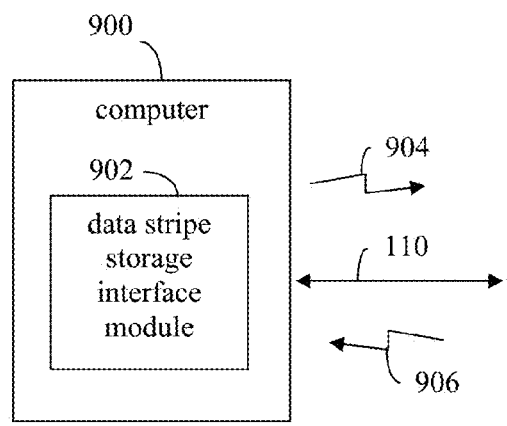
FIG. 9 shows a block diagram of a computer, according to an example embodiment of the present invention.

FIG. 9 shows a block diagram of a computer 900, according to an example embodiment. Computers 102 shown in FIG. 1 may be implemented as computer 900, in an embodiment. In an embodiment, flowchart 800 may be performed by computer 900. As shown in FIG. 9, computer 900 may include a data stripe storage interface module 902. Data stripe storage interface module 902 may be configured to generate a storage request 904 (e.g., a "store-stripe" operation), which is transmitted from computer 900 (e.g., according to step 802) by a network interface of computer 900 to data store 400. For example, an application executing at computer 900 may desired to store data at data store 400. Data stripe storage interface module 902 may receive data from the application, and generate storage request 904 to store the data at data store 400. In an embodiment, storage request 904 includes the data in the form of a data stripe, such as one of data stripes 604 and 702 shown in FIG. 7 for storage in data store 400. In an embodiment, storage request 904 is transmitted to a storage controller at data store 400, which transmits each data page of the data stripe to the corresponding storage devices 402 of data store 400. In another embodiment, storage request 904 includes a plurality of storage request signals, with each storage request signal including a corresponding data page of the data stripe. Each storage request signal is transmitted to a corresponding storage device 402 of data store 400, to store the data page in the corresponding storage device 402, so that the data stripe is stored in data store 400.

In an embodiment, prior to transmitting storage request 904, computer 900 may transmit a "get-stripeset" request to data store 400. In response to the "get-stripeset" request, computer 900 may receive a stripeset reference, which identifies a set of storage devices 402 of data store 400 forming a current stripeset where the data stripe may be stored. Storage request 904 may be directed to the set of storage devices identified by the "get-stripeset" request.

Furthermore, in response to storage request 904, data stripe storage interface module 902 may receive a storage response 906 from data store 400. Storage response 906 may include a stripe reference, such as a stripe reference for one of data stripes 604 and 702, generated by data store 400. In an embodiment, storage response 906 may be received from a storage controller at data store 400. In another embodiment, storage response 906 may include a plurality of storage response signals, with each storage response signal being received from a corresponding storage device 402, and indicating a page slot of the storage device 402 in which the corresponding data page of the data stripe was stored.

If computer 900 desires to access the data of the data stripe stored in data store 400, computer 900 may transmit a "get-stripe" request to data store 400. The "get-stripe" request may be directed to a storage controller of data store 400, when present, or directly to storage devices 402*a*-402*z* (e.g., in a plurality of "get-stripe" or "get-data-page request signals"). The "get-stripe" request includes a stripe reference for the data stripe. Data store 400 receives the stripe reference as input and returns the data in the stripe identified by that stripe reference.

Thus, in an embodiment, a technique for storing data stripes of variable sizes is provided. A data stripe that includes M data pages, which may be the same length or less than the rank of the stripeset, is stored in a data store. Each data page of the data stripe is stored in a first open slot of a corresponding storage device of the stripeset, which may be all or a subset of the N storage devices of the stripeset, depending on whether the data stripe is the same length or less than the rank of the stripeset. A reference to the data stripe is generated, which may include a storage device ID of the first storage device that stores a page of the data stripe, and an array of M addresses that identify the page slots where each page of the stripe is stored.

As described above, the data stripe may be stored in any combination of storage devices of the stripeset, when N>M. In an embodiment, the data stripe may be stored in a "prefix" of the stripeset, which is a "logical" first set of storage devices of the stripeset (e.g., a set of the left-most storage devices of stripeset 602 shown in FIG. 7). For instance, as described above, the N storage devices of the stripeset may be associated in a logical sequence, the logical sequence including a first storage device of the N storage devices at a logical first end of the stripeset (e.g., having a storage device identified as the first storage device of the stripeset, such as by being assigned identifier "1", etc.) and a second storage device of the N storage devices at a logical second end of the stripeset (e.g., being identified as a last storage device of the stripeset, such as by having a highest/last assigned identifier). For example, referring to stripeset 602 shown in FIG. 7, first storage device 402*a* may be the storage device at the logical first end of stripeset 602 (e.g., having the lowest identifier of "1"), and fourth storage device 402*d* may be the storage device at the logical second end of stripeset 602 (e.g., having the highest identifier of "4").

Figure 10:
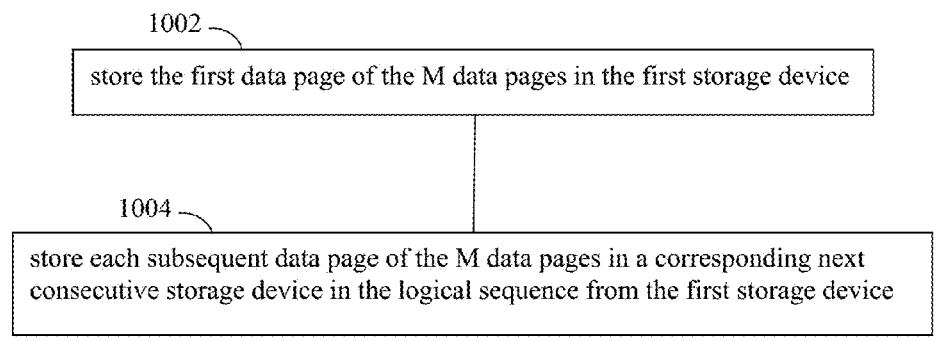
FIG. 10 shows a flowchart for storing a data stripe in a stripeset prefix, according to an example embodiment of the present invention.

Thus, in an embodiment, step 502 of flowchart 500 may be performed according to a flowchart 1000 shown in FIG. 10. In step 1002 of flowchart 1000, the first data page of the M data pages of the data stripe is stored in the first storage device. In step 1004, each subsequent data page of the M data pages is stored in a corresponding next consecutive storage device in the logical sequence from the first storage device. For instance, referring to data stripe 702 shown in FIG. 7, first data page 704a is stored in first storage device 402a (at a logical first end of stripeset 602), second data page 704b is stored in next consecutive second storage device 402b, third data page 704c is stored in next consecutive third storage device 402c, and fourth data page 704d is stored in next consecutive fourth storage device 402d (at a logical second end of stripeset 602).

B. Example Embodiments for Sliding Window Striping

After a number of data stripes is stored in a stripeset of a data store, one or more of the storage devices of the stripeset may become full. In such case, according to conventional techniques, a new stripeset may be formed in the data store that does not include any of storage devices of the previous stripeset, even if one or more of the storage devices of the previous stripeset are not full. This is an inefficient use of storage.

In an embodiment, as described above, data stripes may be stored in a prefix of a stripeset. If data stripes stored in the stripeset have varying numbers of data pages, the logical first storage device of the stripeset becomes full before other storage devices of the stripeset. In such case, in an embodiment, the stripeset is "advanced," "slid," or "shifted." Sliding the stripeset moves the stripeset in a logical direction (e.g., logical left or right) to remove the full storage device from the stripeset and to add a non-full storage devices to the stripeset.

Figure 11:
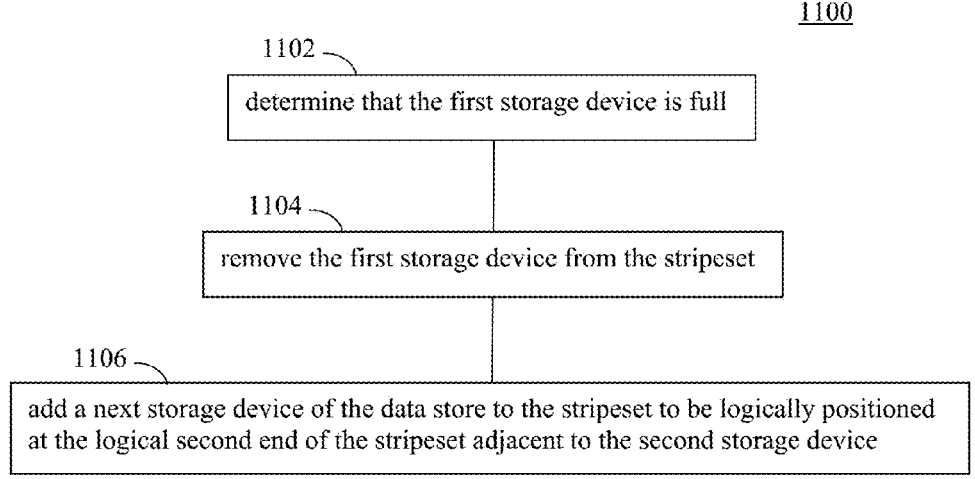
FIG. 11 shows a flowchart providing a process for stripeset sliding, according to an example embodiment of the present invention.

For instance, FIG. 11 shows a flowchart 1100 providing a process for stripeset sliding, according to an example embodiment. Flowchart 1100 may be performed if a logical end most storage device of a stripeset becomes full (or otherwise is desired to no longer be included in the stripeset). In an embodiment, flowchart 1100 may be performed by data store 400 (e.g., by a storage controller of data store 400) shown in FIG. 4. Other structural and operational embodiments will be apparent to persons skilled in the relevant art(s) based on the discussion regarding flowchart 1100. Flowchart 1100 is described as follows.

Figure 12:
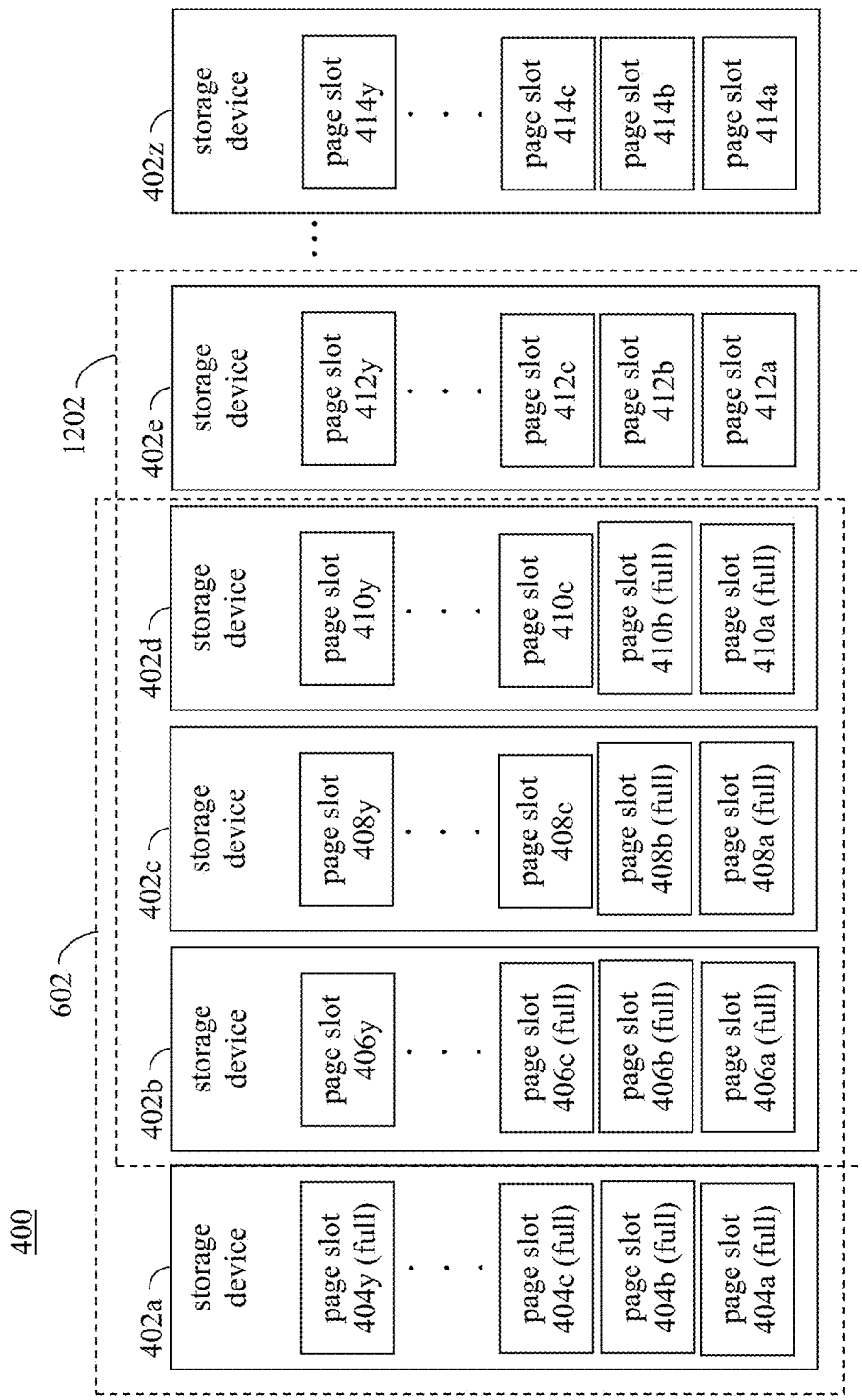
FIG. 12 shows a block diagram of a data store including a sliding stripeset window, according to an example embodiment of the present invention.

As shown in FIG. 11, flowchart 1100 begins with step 1102. In step 1102, the first storage device is determined to be full. For example, FIG. 12 shows a block diagram of data store 400 including first stripeset 602. As shown in FIG. 12, first stripeset 602 includes first-fourth storage devices 402a-402d (N=4). Storage devices 402a-402d are associated in a logical sequence, with storage device 402a at a logical first end of stripeset 602 and storage device 402d at a logical second end of stripeset 602. According to step 1102, storage device 402a may be determined to be full. As indicated in FIG. 12, page slots 404a-404y are full (e.g., storing data pages of data stripes). For instance, when storage device 402a becomes full, storage device 402a may transmit a full indication to a storage controller of data store 400. Alternatively, storage device 402a may provide the full indication when a storage request is received by storage device 402a from the storage controller or by another device (e.g., computer 900 shown in FIG. 9).

Note that in the example of FIG. 12, page slots 406a-406c of storage device 402b, page slots 408a and 408b of storage device 402c, and page slots 410a and 410b of storage device 402d are also full, but not all page slots of storage devices 402b-402d are full, so storage devices 402b-402d are not determined to be full in step 1102. However, additional storage devices of stripeset 602 may become full simultaneously with storage device 402a. For example, storage device 402b, and possibly additional storage devices, may become full simultaneously with storage device 402a if a data page is stored in storage device 402b (and potentially further storage devices) each time a data page is stored in storage device 402a, and storage device 402b has the same storage capacity as storage device 402a. Note that if data stripes are stored in a prefix of stripeset 602, storage devices of stripeset 602 that are closest to storage device 402a will tend to become full most rapidly. Because storage device 402a is at a logical first end of stripeset 602, and thus stores a data page from each data stripe stored in stripeset 602 (assuming data stripes are added to a prefix of stripeset), storage device 402a is a first storage device of stripeset 602 to become full.

In step 1104, the first storage device is removed from the stripeset. In an embodiment, as a result of the full indication, storage device 402a may be removed from stripeset 602. If further storage devices of stripeset 602 were also determined to be full in step 1102, those storage devices may also be removed from stripeset 602 in step 1104.

In step 1106, a next storage device of the data store is added to the stripeset to be logically positioned at the logical second end of the stripeset adjacent to the second storage device. Referring to FIG. 12, in an embodiment, a next storage device 402 of data store 400 that is not included in stripeset 602 may be added to stripeset 602 to replace the removed storage device 402a. In an embodiment, the storage device that is added to stripeset 602 is a storage device 402 of data store 400 that is logically next to storage device 402d at the logical second end of stripeset 602. In the example of FIG. 12, the storage device logically positioned next to storage device 402d is storage device 402e (e.g., storage device 402e has an identifier of "5" logically next to the identifier of "4" for storage device 402d). If further storage devices of stripeset 602 were removed from stripeset 602 in step 1104, corresponding further storage devices of data store 400 in logical sequence from storage device 402e may be added to stripeset 602.

For instance, as shown in FIG. 12, a second stripeset 1202 is formed as an updated version of stripeset 602. Second stripeset 1202 includes storage devices 402b-402e. Storage device 402a, which was determined to be full, is not present in second stripeset 1202. Storage device 402e, which is next in logical sequence to storage device 402d is added to second stripeset 1202.

Thus, in an embodiment, a technique for sliding window striping is provided. The overflow of one or more storage devices at the beginning of a stripeset is handled by assigning to the stripeset a same number of storage devices at the end of the stripeset.

C. Example Stripeset Detection Embodiments

Devices that desire to store data stripes may need to know the location of one or more current, non-empty stripesets in storage in which to store the data stripes, similarly to the "get-stripeset" request described above. For example, computer 900 shown in FIG. 9 may desire the capability to track the store state of storage devices 402 in data store 400, including the capability to determine at a boot time for computer 900 one or more non-empty stripesets in data store 400 where data can be stored.

In an embodiment, a storage device may have three states: empty, active, or full. The empty state indicates that the storage device does not store data. The active state indicates that the storage device stores at least some data and/or is currently included in a stripeset. The full state indicates that the storage device is full (e.g., the portion of the storage media of the storage device allocated for storing data pages of data stripes is filled). In the full state, the storage device cannot process further append operations.

Figure 13:
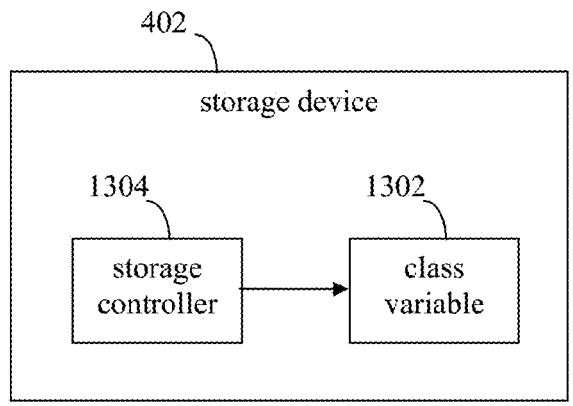
FIG. 13 shows a block diagram of a storage device that includes a class variable, according to an example embodiment of the present invention.

In embodiments, each storage device 402 of data store 400 may be configured to be self-describing with regard to the state of its storage. For example, in an embodiment, each storage device may store a state variable, having a value that indicates a "class" of the storage device. For instance, FIG. 13 shows a block diagram of a storage device 402, according to an example embodiment. As shown in FIG. 13, storage device 402 includes a storage controller 1304, and stores a class variable 1302. Storage controller 1304 is configured to generate and maintain class variable 1302. Class variable 1302 may have an integer or non-integer value that indicates a class, or store state, of storage device 402. For example, class variable 1302 may have a value of zero (or other value) to indicate an empty state for storage device 402, a value of one (or other value) to indicate an active state for storage device 402, or a value of two (or other value) to indicate a full state for storage device 402. Each of storage devices 402a-402z of FIG. 4 may include a respective storage controller 1304 and store a respective class variable 1302. In an embodiment, class variable 1302 may be stored persistently (e.g., in non-volatile storage), so that if storage device 402 fails and subsequently recovers, storage device 402 retains the same class indicated by class variable 1302 at the time of the failure. Class variable 1302 may be stored in various locations, including storing class variable 1302 in memory allocated to or included in storage controller 1304, storing class variable 1302 in each data page stored in storage device 402 (e.g., in a header for the data page), or storing class variable 1302 at another location.

In an embodiment, the class variable of a storage device may be a parameter to an append operation performed with respect to the storage device. For example, if computer 900 of FIG. 9 is attempting to store a data stripe in data store 400 of FIG. 4, data stripe storage interface module 902 may include a class indication in store request 904 transmitted to data store 400. The class indication included in store request 904 may be compared by each storage controller 1304 of the storage devices of the current stripeset with the corresponding class variable 1302 to determine how storage request 904 is processed, and may cause class variable 1302 of one or more of the storage devices 402 of the current stripeset to be modified.

Figure 14:
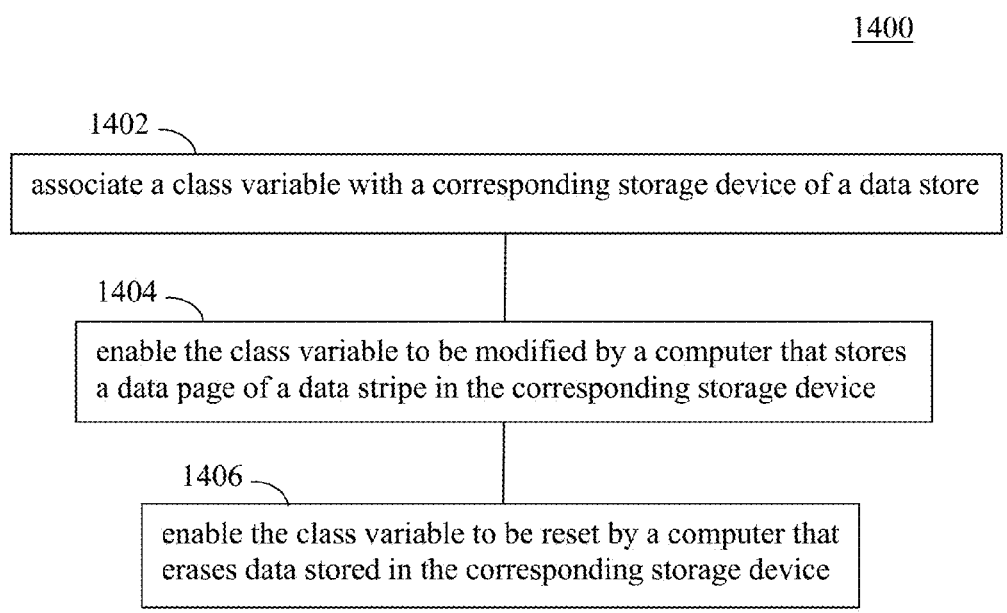
FIG. 14 shows a flowchart providing a process for handling storage in a storage device, according to an example embodiment of the present invention.

For example, FIG. 14 shows a flowchart 1400 providing a process for handling storage in a storage device, according to an example embodiment. Flowchart 1400 may be performed by one or more storage devices 402 of data store 400. Other structural and operational embodiments will be apparent to persons skilled in the relevant art(s) based on the discussion regarding flowchart 1400. Flowchart 1400 is described as follows.

As shown in FIG. 14, flowchart 1400 begins with step 1402. In step 1402, a class variable is associated with a corresponding storage device of a data store. As described above, as shown in FIG. 13, class variable 1302 may be associated with storage device 402. Each storage device 402 of a stripeset may have an associated class variable 1302. Class variable 1302 indicates a class or store status of the corresponding storage device 402.

In step 1404, the class variable is enabled to be modified by a computer that stores a data page of a data stripe in the corresponding storage device. For example, computer 900 may transmit storage request 904 (FIG. 9) to store a data stripe in stripeset 602 shown in FIG. 6. A data page of the data stripe may be stored in storage device 402 shown in FIG. 13. As a result of storing the data page in storage device 402, a value of class variable 1302 may be modified. For example, if storing the data page in storage device 402 causes storage device 402 to become full, class variable 1302 may be modified by storage controller 1304 from an active state to a full state.

In step 1406, the class variable is enabled to be reset by a computer that erases data stored in the corresponding storage device. For example, computer 900 may transmit an erase request to storage device 402 of FIG. 9 (and optionally to further storage devices). As a result, a value of class variable 1302 may be reset by storage controller 1304 (e.g., changed to a "0" value or otherwise modified) to indicate that storage device 402 is in an empty state. In an embodiment, an erase operation may be the only operation that can decrease the value of class variable 1302, although in other embodiments, other operations may be able to decrease the value of class variable 1302. In an embodiment, an erase operation may be configured to clear a portion of the page slots of a storage device. In such case, class variable 1302 may be reset to zero when all page slots of the storage device have been erased.

Figure 15:
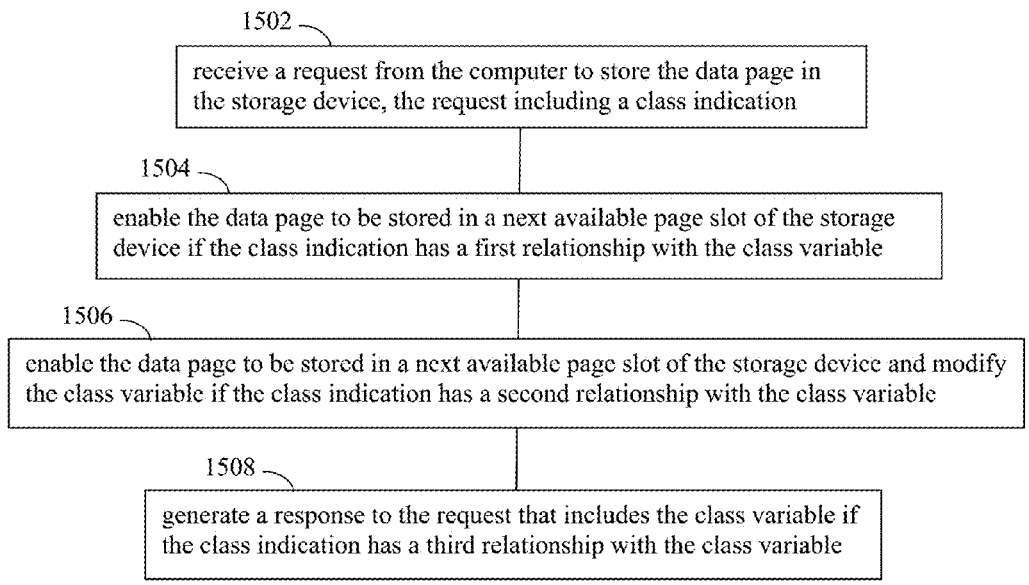
FIG. 15 shows a flowchart providing a process for modifying a class variable based on a store request, according to an example embodiment of the present invention.
Figure 16:
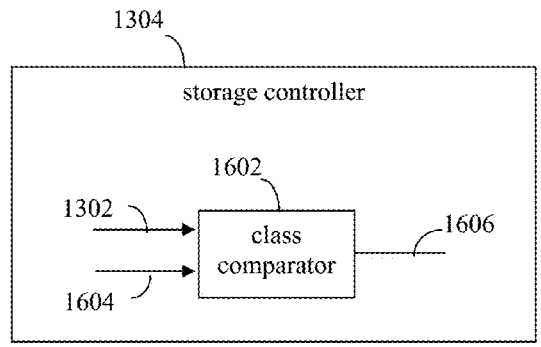
FIG. 16 shows a block diagram of a storage controller, according to an example embodiment of the present invention.

Step 1404 may be performed in various ways. For example, FIG. 15 shows a flowchart 1500 providing a process for modifying a class variable based on a store request, according to an example embodiment. Flowchart 1500 may be performed by storage controller 1304 of FIG. 13, for example. For instance, FIG. 16 shows a block diagram of storage controller 1304, according to an example embodiment. As shown in FIG. 16, storage controller 1304 includes a class comparator 1602. Further structural and operational embodiments will be apparent to persons skilled in the relevant art(s) based on the discussion regarding flowchart 1500. Flowchart 1500 is described as follows.

As shown in FIG. 15, flowchart 1500 begins with step 1502. In step 1502, a request is received from the computer to store the data page in the storage device, the request including a class indication. For example, as described above, storage request 904 shown in FIG. 9 may be received by a storage device, such as storage device 402 shown in FIG. 13. Storage request 904 may provide a data page to be stored in storage device 402, and may include a class indication, shown as a class indication 1604 in FIG. 16.

In step 1504, the data page is enabled to be stored in a next available page slot of the storage device if the class indication has a first relationship with the class variable. In embodiments, the first relationship between the class indication 1604 and class variable 1302 associated with class variable 1302 to enable the data page to be stored may be defined in any manner, such as class indication 1604 and class variable 1302 being equal. In an embodiment, class comparator 1602 shown in FIG. 16 may be configured to compare class indication 1604 received in storage request 904 with class variable 1302 of storage device 402 to determine a relationship 1606. In an embodiment, if relationship 1606 is determined as equal, an append operation may be performed as normal, such that a data page provided in storage request 904 is stored in a page slot of storage device 402.

In step 1506, the data page is enabled to be stored in a next available page slot of the storage device and the class variable is modified if the class indication has a second relationship with the class variable. In embodiments, the second relationship between the class indication received in storage request 904 and class variable 1302 associated with class variable 1302 to enable the data page to be stored and the class variable to be modified may be defined in any manner, such as class variable 1302 being less than class indication 1604. For example, if relationship 1606 determined by class comparator 1602 indicates that class variable 1302 is less than class indication 1604, storage controller 1304 may increase class variable 1302 to the value of class indication 1604. The append operation may also be performed, such that a data page provided in storage request 904 is stored in a page slot of storage device 402.

In step 1508, a response to the request is generated that includes the class variable if the class indication has a third relationship with the class variable. In embodiments, the third relationship between the class indication received in storage request 904 and class variable 1302 associated with class variable 1302 may be defined in any manner, including class variable 1302 being greater than class indication 1604. For example, if relationship 1606 determined by class comparator 1602 indicates that class variable 1302 is greater than class indication 1604, the append operation is not performed. Instead, storage device 402 may transmit an exception message to computer 900 that includes the current value of class variable 1302 of storage device 402.

Note that in an embodiment, a get-class operation may be configured to enable a device to request the value of class variable 1302 of a storage device 402. For example, computer 900 may transmit a get-class request to a storage device 402. In an embodiment, a get-class operation may be included in another operation, such as a read operation, which transmits a page slot address to a storage device, and the data stored in the page slot address is received in response. The read operation may also return a value of the class variable of the storage device.

Modifying the behavior of an append operation according to a class variable, as described above, may be used to enable multiple computers to share a set of storage devices without additional synchronization. In an embodiment, after a device (e.g., computer 900) increases the value of the class variable of a storage device by performing an append operation, subsequent append operations have to use the increased class value or a higher class value to be enabled to be performed. This is accomplished by communications between computer 900 and the storage devices, and does not require computer-to-computer communication. If computer 900 attempts an append operation using a class indication with lower value than the class variable of the storage device, the append operation is rejected, and the value of the class variable of the storage device is transmitted to computer 900 in the exception message in response.

In an embodiment, if the class indication received in step 1502 (FIG. 15) from computer 900 indicates an active class, the store-stripe operation stores a data page in storage device 402 (assuming the class variable of the storage device is equal to the class indication). Computer 900 may "seal off" a stripeset by appending data pages to the storage devices with a "full" class value provided for the class indication. As indicated in step 1506, the class variable of the storage device may be increased to the value of class indicator (in this case, a "full" class value) if computer 900 provides a class indicator with a higher value than the class variable of the storage device. The "full" class value prevents any further append operations to the storage device using an active class as class indication. In an embodiment, the storage device may be configured to automatically increase its class variable from an "active" value to a "full" value when there is an attempt to execute an append operation, but the storage device does not have storage space for a data page.

In an embodiment, a computer, such as computer 900, may be configured to determine an active stripeset in a data store, such as data store 400 in FIG. 4. For example, computer 900 may be configured to scan the sequence of storage devices 402a-402y of data store 400 to find a subsequence of storage devices 402a-402y that have class variables indicating an active state.

In another embodiment, data store 400 may be log-structured, such that storage devices are filled up with data pages in a logical sequence. For example, referring to FIG. 12, as described above, storage devices at the logical first end (e.g., storage device 402a) of data store 400 may become full before storage devices closer to the logical second end (e.g., storage device 402z) of data store 400. In the example of FIG. 12, this may mean that storage devices 402a-402z sequentially become full from left to right (e.g., where storage devices 402 toward the left have logically lower numbered identifiers than storage devices 402 toward the right in FIG. 12). After one or more of storage devices 402a-402z are full, a "garbage collector" may be enabled to empty the full storage devices 402 having logically lower numbered identifiers, so they can subsequently be erased.

Figure 17:
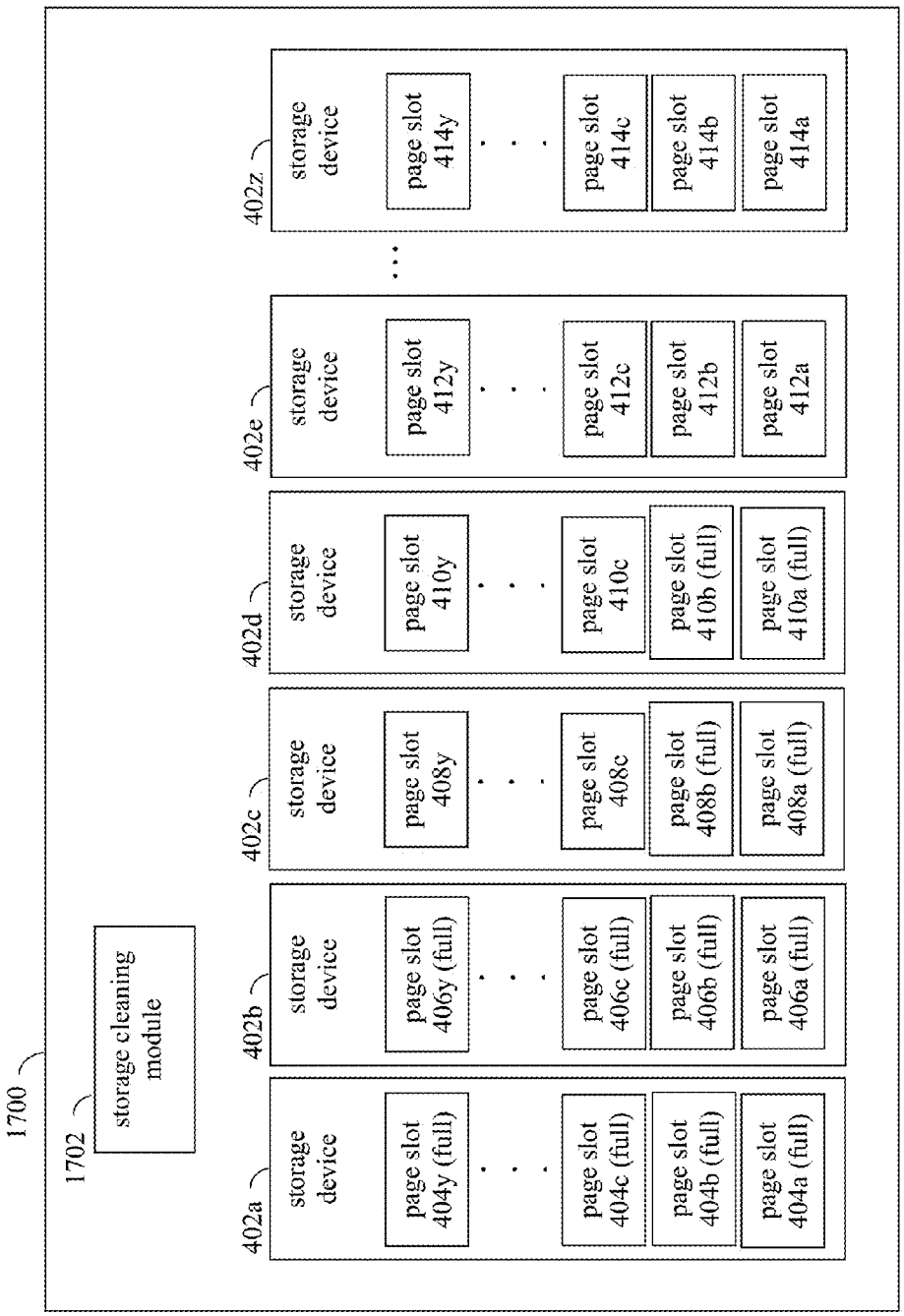
FIG. 17 shows a block diagram of a data store, according to an example embodiment of the present invention.

For instance, FIG. 17 shows a block diagram of a data store 1700, according to an example embodiment. Data store 1700 is similar to data store 400 shown in FIG. 12, with the addition of a storage cleaning module 1702. Storage cleaning module 1702 is configured to perform a "garbage collector" function. Storage cleaning module 1702 is configured to clean out data from full storage devices, so that the storage devices may again be used in a stripeset to store data pages of data stripes. For example, referring to FIG. 17, storage devices 402a and 402b are both full, because page slots 404a-404y of storage device 402a and page slots 406a-406y each store a data page. Storage cleaning module 1702 may determine that storage device 402a is to be cleaned. In such case, storage cleaning module 1702 is configured to save each stripe stored in data store 1700 that includes a data page stored in storage device 402a by copying the stripe to a currently active stripeset. For example, page slot 404a of storage device 402a may store a data page included in a three-data page data stripe stored in storage devices 402a-402c. Storage cleaning module 1702 may copy the three-data page data stripe from storage devices 402a-402c to an active stripeset (e.g., in storage devices 402d-402f). In this manner, page slot 404a of storage device 402a is cleaned. Each page slot 404 of storage device 402a may be cleaned in a similar manner, and/or one or more page slots 404 determined to store data pages of unneeded data stripes can be erased by storage cleaning module 1702. Storage cleaning module 1702 may determine which stripes are needed (and may save them, as described above) or unneeded in any manner. After storage cleaning module 1702 copies all of the useful data stripes having data pages stored in storage device 402a to different storage devices, storage device 402a may be erased and made available to be included in a subsequent stripeset for storing subsequent data stripes. Because storage devices 402 at a logical first end of data store 1700 tend to become full first, storage cleaning module 1702 may operate to clean storage devices 402a-402z in a sequential fashion from the logical first end of data store 1700 to the logical second end of data store 1700 (e.g., from left to right in FIG. 17), after each successive storage device becomes full.

In such log-structured storage, storage devices 402 of data store 400 can be configured in a "ring" configuration. For example, as described above, storage devices 402a-402z may be associated in a logical sequence, from storage device 402a to storage device 402z (e.g., having storage device identifiers 1-N, respectively), where storage device 402b logically follows storage device 402a, storage device 402c follows storage device 402b, etc. Furthermore, the next storage device in the logical sequence following the Nth storage device, which is storage device 402z in FIG. 17, is the first storage device, which is storage device 402a in FIG. 17.

At any given time, a data store configured in a ring configuration may have three subsequences: a contiguous sequence of empty storage devices, followed by a contiguous sequence of full storage devices, followed by a contiguous sequence of active storage devices. For example, referring to FIG. 17, data store 1700 includes a contiguous sequence of empty storage devices, storage devices 402e-402z, followed by a contiguous sequence of full storage devices, storage devices 402a and 402b, followed by a contiguous sequence of active storage devices, storage devices 402c and 402d. A sequence of full storage devices may not be present when the data store 1700 is initiated or if storage cleaning module 1702 has cleared all full storage devices. The sequence of active storage devices may not be present when data store 1700 is initiated, or immediately after filling a previously active stripeset and before starting a next stripeset. When data store 1700 is initiated, no active or full storage devices may be present because all storage devices are empty. However, much of the time, all three sequences are present.

As described above, a computer, such as computer 900, may determine a currently active stripeset by a form of binary search, where a range of storage devices containing active storage devices is determined. A corner case may arise when both a prefix and a suffix of the storage devices of the data store are erased. In such case, the data store may include two sequences of erased storage devices (e.g., may include a first sequence of erased storage devices, followed by full storage devices, followed by active storage devices, followed by a second sequence erased storage devices). If a middle storage device in the data store is also erased, then a first step of a binary search doesn't reduce the number of storage devices to be searched. If the range of full and active storage devices is relatively small, this problem can repeat and may ultimately defeat the logarithmic search time that a binary search normally offers.

In an embodiment, to avoid the corner case, and enable search time to be logarithmic in the number of storage devices, a persistent updatable epoch number may be assigned to each storage device. For instance, FIG. 18 shows a block diagram of a storage device 402, according to an example embodiment. As shown in FIG. 18, storage device 402 includes a storage controller 1802. Storage controller 1802 is configured to generate class variable 1302 (in a similar fashion as described above with respect to storage controller 1304 in FIG. 13) and to generate an epoch value 1804. Epoch value 1804 is a number or other representation assigned to storage device 402 configured to indicate an erase state of storage device 402 relative to other storage devices in a data store. Each storage device 402 in a data store (e.g., data store 400, data store 1700, etc.) may include a storage controller 1802 to generate a corresponding epoch value 1804. When the data store containing storage device 402 is initialized, storage controller 1802 sets epoch value 1804 to an initial value. Each time that storage device 402 is erased, storage controller 1802 increments epoch value 1804 (e.g., increases epoch value 1804 by one). Thus, if both a prefix and a suffix of the storage devices of the data store are erased/empty, they will each include the same value for epoch value 1804 only when the data store is first initialized. At later times, the first sequence of erased storage devices of the data store will have a higher value for epoch value 1804 than the second sequence of erased storage devices of the data store.

Figure 20:
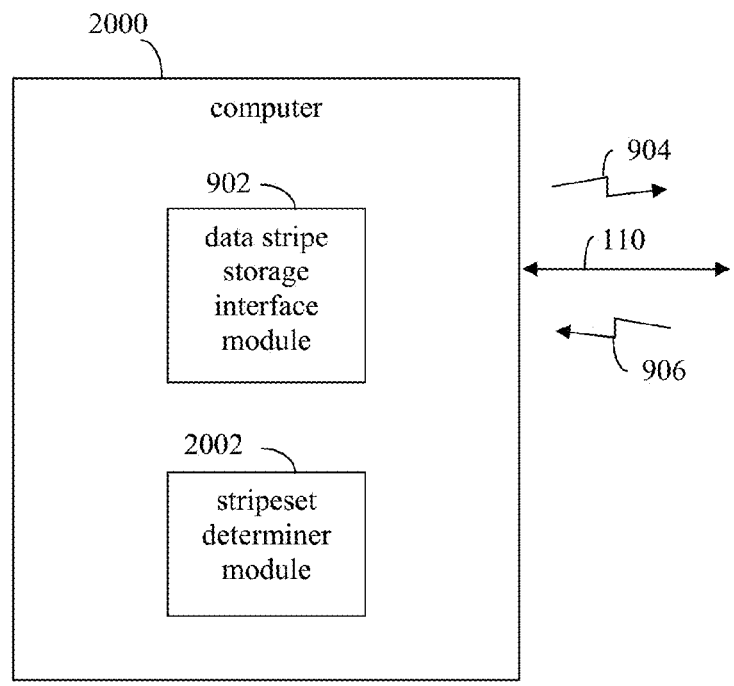
FIG. 20 shows a block diagram of a computer, according to an example embodiment of the present invention.

FIG. 19 shows a flowchart 1900 providing a process for determining an active stripeset, according to an example embodiment. Flowchart 1900 may be performed by a device (e.g., a computer 102 in FIG. 1) with regard to a data store that includes storage devices having epoch values, as described above. For instance, FIG. 20 shows a block diagram of a computer 2000, according to an example embodiment. In an embodiment, computer 2000 may perform flowchart 1900. As shown in FIG. 20, computer 2000 includes data stripe storage interface module 902 (as described above with respect to FIG. 9) and a stripeset determiner module 2002. Stripeset determiner module 2002 is configured to determine an active stripeset in a data store. Further structural and operational embodiments will be apparent to persons skilled in the relevant art(s) based on the discussion regarding flowchart 1900. Flowchart 1900 is described as follows.

As shown in FIG. 19, flowchart 1900 begins with step 1902. In step 1902, a logically closest non-empty storage device of the plurality of storage devices to the logical first end is determined. For example, in an embodiment, stripeset determiner module 2002 may perform a search of a data store for a logically closest non-empty storage device of the data store to the logical first end of the data store.

In step 1904, an active storage device of the plurality of storage devices in a range of the logical sequence from the logically closest non-empty storage device to the second storage device is determined. For example, in an embodiment, stripeset determiner module 2002 may perform a search of the data store for an active storage device (e.g., an active storage device having an active value for class variable 1302), in a range of storage devices of the data store from the logically closest non-empty storage device of the data store to the logical second end of the data store.

In step 1906, a continuous range of active storage devices in the plurality of storage devices that includes the determined active storage device is determined. For example, in an embodiment, stripeset determiner module 2002 may perform a search of the data store for a continuous range of active devices in the data store that include the active storage device determined in step 1904. The determined continuous range of active storage devices is the determined stripeset.

Stripeset determiner module 2002 may be configured to perform flowchart 1900 in various ways. In an embodiment, flowchart 1900 may be performed as a series of operations executed by stripeset determiner module 2002. For example, flowchart 1900 may be performed by stripeset determiner module 2002 as a "GetActiveStripeset" operation, which results in a range of storage devices that comprise an active stripeset being returned from the data store being analyzed. Step 1902 may be performed by stripeset determiner module 2002 as a "GetFirstNonEmpty" operation configured to return the first non-empty storage device as a parameter "F". Step 1904 may be performed by stripeset determiner module 2002 as a "GetActiveFromRange(F, S)" operation that uses the parameter "F" and a parameter "S" that is the last storage device in the data store, to return the active storage device as a parameter "AS." Step 1906 may be performed by stripeset determiner module 2002 as a "GetStripesetFromActive(AS)" operation that uses the parameter "AS" to return the continuous range of active storage devices of the data store as the active stripeset.

Figure 21:
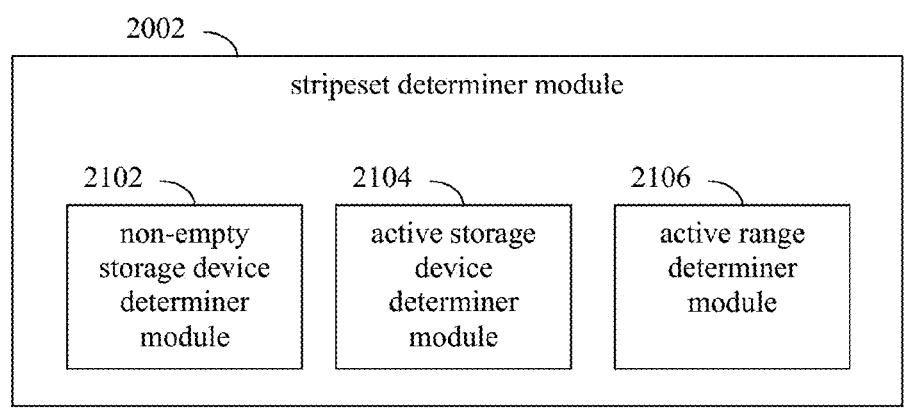
FIG. 21 shows a block diagram of a stripeset determiner module, according to an example embodiment of the present invention.

FIG. 21 shows a block diagram of stripeset determiner module 2002, according to an example embodiment. Stripeset determiner module 2002 of FIG. 21 is configured to perform the steps of flowchart 1900, as described above. As shown in FIG. 21, stripeset determiner module 2002 includes a non-empty storage device determiner module 2102, an active storage device determiner module 2104, and an active range determiner module 2106. These elements of stripeset determiner module 2002 are described as follows.

In an embodiment, non-empty storage device determiner module 2102 may be configured to perform step 1902 of flowchart 1900. For example, in an embodiment, non-empty storage device determiner module 2102 may perform step 1902 according to a flowchart 2200 shown in FIG. 22. Flowchart 2200 is described as follows.

In step 2202, the first storage device is indicated to be the logically closest non-empty storage device if the first storage device is non-empty. In an embodiment, non-empty storage device determiner module 2102 is configured to determine whether the logically first storage device of the data store is non-empty, and if so, to indicate the logically first storage device to be the closest non-empty storage device to the logical first end of the data store. For instance, FIG. 23 shows a block diagram of data store 1700 of FIG. 17, according to an example embodiment. Referring to FIG. 23, storage device 402*a* is the logically first storage device, and is non-empty. Thus, storage device 402*a* is indicated as the closest non-empty storage device to the logical first end of data store 1700, according to flowchart 2200.

In step 2204, all of the plurality of storage devices are indicated to be empty if the first and second storage devices are empty and have a same epoch value. In an embodiment, non-empty storage device determiner module 2102 is configured to determine whether the logically last storage device of the data store is empty, and if so, and if the logically first and last storage devices of the data store have the same epoch value, to indicate that all storage devices in the data store are empty (i.e., a stripeset is not present).

In step 2206, a binary search is performed over the logical sequence from the first storage device to the second storage device to determine a logically closest storage device to the logical first end having an epoch value that is different from an epoch value of the first storage device. In an embodiment, non-empty storage device determiner module 2102 is configured to perform a binary search over the set of storage devices to find the first storage device whose epoch number is different than that of the first storage device. For example, non-empty storage device determiner module 2102 may be configured to perform a recursive function, including determining a middle storage device between the end most storage devices (e.g., middle storage device ID=(the low storage device ID+high storage device ID)/2). If the low storage device and the middle storage device have the same epoch value, a storage device between the middle storage device and the high storage device is determined, and their epoch values are compared. Otherwise, if the low storage device and the middle device have different epoch values, a storage device between the low storage device and the middle storage device is determined, and their epoch values are compared. This process is continued until the storage device closest to the logical first end that has an epoch value different from that of the first storage device is located.

In an embodiment, active storage device determiner module 2104 shown in FIG. 21 may be configured to perform step 1904 of flowchart 1900. For example, in an embodiment, active storage device determiner module 2104 may perform step 1904 according to a flowchart 2400 shown in FIG. 24. Flowchart 2400 is described as follows.

In step 2402, the logically closest non-empty storage device is indicated to be the active storage device if the logically closest non-empty storage device is active. In an embodiment, active storage device determiner module 2104 is configured to determine whether the logically first storage device of the data store is active, and if so, to indicate the logically first storage device to be the active storage device. For instance, referring to FIG. 23, storage device 402*a* was determined to be the logically closest non-empty, but is not active. Thus, storage device 402*a* is not indicated as the active storage device.

In step 2404, the second storage device is indicated to be the active storage device if the second storage device is active and the logically closest non-empty storage device is not active. In an embodiment, active storage device determiner module 2104 is configured to determine whether the logically last storage device of the data store is active, and if so, to indicate the logically last storage device to be the active storage device. For instance, referring to FIG. 23, storage device 402*z* is the logically last storage device, but is not active. Thus, storage device 402*z* is not indicated as the active storage device.

In step 2406, a binary search is performed over the logical sequence from the logically closest non-empty storage device to the second storage device to determine an active storage device. For example, in an embodiment, active storage device determiner module 2104 may be configured to perform a binary search across the data store to determine an active storage device. For example, active storage device determiner module 2104 may be configured to perform a recursive function, including determining a middle storage device between the end most storage devices (e.g., middle storage device ID=(the low storage device ID+high storage device ID)/2). If the middle storage device is active, the middle storage device is indicated as the active storage device. If the middle storage device is empty, a next middle storage device is determined between the current low storage device and the current middle storage device, and the next middle storage device is analyzed to determine whether it is active. If the middle storage device is full, a next middle device is determined between the current middle storage device and the current high storage device. This process is continued until an active storage device is located.

With regard to the example of FIG. 23, a middle storage device between storage devices 402*a* and 402*z* may be storage device 402*m*, which may not be active, and may be empty. Thus, a next middle storage device is determined between storage device 402*a* and storage device 402*m*, which may be storage device 402*g*. Storage device 402*g* may not be active, and may be empty. Thus, a next middle storage device is determined between storage device 402*a* and storage device 402*g*, which may be storage device 402*d*. Storage device 402*d* is active, and thus is indicated as the active storage device determined for data store 1700 according to flowchart 2400.

In another embodiment, an exponential probing sequence may be used in step 2406 instead of the binary search. Starting from a low storage device, storage devices low+1, low+2, low+4, low+8, low+16, etc., are probed, until either an active storage device is encountered (in which case it is returned), or an empty storage device or the last storage device is encountered (in which case recursively perform the search on the range of storage devices defined by the last two probes).

In an embodiment, active range determiner module 2106 shown in FIG. 21 may be configured to perform step 1906 of flowchart 1900. For example, in an embodiment, active range determiner module 2106 may perform step 1906 according to a flowchart 2500 shown in FIG. 25. Flowchart 2500 is described as follows.

In step 2502, the plurality of storage devices in the logical sequence is searched from the determined active storage device towards the first storage device for a first non-active storage device. For example, active range determiner module 2106 is configured to find a first storage device in the range of active storage devices by searching sequentially from the determined active storage device towards the logical first storage device. For example, referring to FIG. 23, storage device 402*b* is determined to be the first non-active storage device when searching from active storage device 402*d* towards storage device 402*a*.

In step 2504, the plurality of storage devices in the logical sequence is searched from the determined active storage device towards the second storage device for a second non-active storage device. For example, active range determiner module 2106 is configured to find a last storage device in the range of active storage devices by searching sequentially from the determined active storage device towards the logical last storage device. For example, referring to FIG. 23, storage device 402f may be determined to be the second non-active storage device when searching from active storage device 402d towards storage device 402z.

In step 2506, the continuous range of active storage devices is indicated to be a continuous range of storage devices between the first non-active storage device and the second non-active storage device. For example, referring to FIG. 23, range determiner module 2106 may be configured to set the continuous range of active storage devices to be the continuous range from storage device 402c to storage device 402e, which are between storage device 402b determined in step 2502 and storage device 402f determined in step 2504. As indicated in FIG. 23, the continuous range of storage devices from storage device 402c to storage device 402e is an active stripeset 2302.

In another embodiment, storage devices included in a currently active stripeset may be tracked by maintaining a master directory. For example, FIG. 26 shows a block diagram of a data store 2600 that maintains a master directory 2602 (e.g., in memory/storage) (storage devices 402 of data store 2600 are not shown in FIG. 26 for ease of illustration). Master directory 2602 indicates which storage devices are included in one or more currently active stripesets. Whenever there is a change to the set of storage devices included in an active stripeset, master directory 2602 is updated to indicate the modification. When a device (e.g., computer 900) that accesses storage devices of data store 2600 is initialized (e.g., boots up), the device may read master directory 2602 to determine the bounds of the current stripeset in data store 2600. In an embodiment, master directory 2602 may be an append-only log, where changes to a current stripeset are appended to master directory 2602 rather than be written over master directory 2602.

Although master directory 2602 may be used to track a current stripeset, master directory 2602 may become inaccessible due to a storage device or networking failure. Thus, in an embodiment, copies of master directory 2602 may be stored in multiple locations (e.g., in and/or outside of data store 2600). The multiple copies of master directory 2602 may be kept in synch by copying master directory 2602 each time it is modified. Furthermore, updates to master directory 2602 need to be coordinated between the accessing devices (e.g., computers 102a-102c in FIG. 1). In contrast, a stripeset may be determined according to flowchart 1900 at any time, with the state of the included storage devices typically being available unless one or more of the storage devices are unavailable. Using class information, synchronization is not required. Each accessing device is independently enabled to determine a change of the state of a storage device. Moreover, as described above in an embodiment, an accessing device may include a class indicator as a parameter to an append operation, and a receiving storage device processes the append operation if the class indicator of the append operation is greater than or equal to the class of the storage device.

Thus, in an embodiment, a technique for associating a class variable with each storage device is provided. In an embodiment, a requesting device may increment the class variable by appending data in a higher class to the storage device, and may reset the class variable to zero by erasing the storage device. At boot time, a requesting device may determine the stripeset for a class by finding the sequence of storage devices of an active class. For example, in an embodiment, if the data store is log-structured, a requesting device can use a binary search algorithm to find the stripeset for the class.

D. Example Embodiments for Multiclass Stripesets

Load balancing across storage devices in a data store may be desired due to the relative frequency of data reads and writes for different types of data stored in the data store. For example, a database system may maintain a log that is stored in a stripeset. Most storage operations performed with regard to the log may be append operations. Although the log data may rarely be read after it stored, the log data typically is retained for a relatively long period in case the database system fails, in which case the log is used for recovery. Thus, if a stripeset is configured to store only log data, poor utilization of I/O operations available with regard to the log stripeset may result. The stripeset may be heavily utilized while the log is being written. However, after the stripeset is filled up, the stripeset may be idle most of the time until its content is garbage collected (e.g., by copying the log to an archive medium).

In contrast to the log, the database stored in the database system may have a relatively low amount of update activity and a relatively large amount of read activity. Unlike the stripeset that stores the log, a stripeset that stores the database may receive a relatively large number of read operations after it is written. Thus, after the stripeset of the database is full, the stripeset may still be actively used.

Writing multiple types of data to a stripeset at the same time may be undesirable. For instance, it is well known that a log can be a bottleneck in a database system, because the transaction rate is limited by the rate at which data can be appended to the log. Therefore, during the time that a stripeset is being used for appending to the log, the stripeset may not be desirable for storing other types of data. For example, database updates may undesirable to the stripeset during the same time that log updates may be received by the stripeset, because this would use some of the available update bandwidth of the stripeset and thus reduces the maximum transaction rate.

In an embodiment, multiples types of data may be stored on each storage device of a data store in a manner to balance the workload of the data store. The class mechanism can be used to control the type of data being written to the stripeset by using different classes for different kinds of data. For example, instead of having a single "active" class, there could be multiple active classes. For instance, when a log and database data are stored in a data store, a database class and a log class may be present as active classes. In such an embodiment, there may be four total classes or states, such as an empty state, a database state, a log state, and a full state. Each class may be indicated in class variable 1302 (FIG. 13) for a corresponding storage device 402 by a corresponding integer or other value. For example, class variable 1302 may have a value of zero to indicate an empty state for storage device 402, a value of one to indicate a database state for storage device 402, a value of 2 to indicate a log state for storage device 402, or a value of three to indicate a full state for storage device 402. When log data is written to storage device 402, class variable 1302 may be set to indicate the log state, and when database data is written to storage device 402, class variable 1302 may be set to indicate the database state.

In an embodiment, one or more active stripesets may be present for storing the log and one or more active stripesets may be present for storing the database. For example, a stripeset may be initially designated to be used to store database data. When the storage devices of the stripeset reach a certain fullness threshold, such as being 70% full, the stripeset may be redesignated to be used to store log data. According to the class mechanism, the stripeset may be redesignated from database data to log data by appending a stripe of the log class to the stripeset. Appending a stripe of the log class to the stripeset increases the value of class variable 1302 for the storage devices of the stripeset, and thereby prevents subsequent append operations from using the stripeset for the database class. This technique enables multiclass stripesets to be generated, because two or more distinct classes of data are stored in the same stripeset.

FIG. 27 shows a flowchart 2700 providing a process for generating a multiclass stripeset, according to an example embodiment. Flowchart 2700 may be performed by a device storing data in a data store, such as computer 900 shown in FIG. 9, or may be performed by one or more storage devices in the data store. Further structural and operational embodiments will be apparent to persons skilled in the relevant art(s) based on the discussion regarding flowchart 2700. Flowchart 2700 is described as follows.

As shown in FIG. 27, flowchart 2700 begins with step 2702. In step 2702, at least one data page that includes first data of a first data type is stored in a storage device of the data store when the class variable has a first value. For example, FIG. 28 shows a block diagram of data store 400, according to an example embodiment. As shown in FIG. 27, storage devices 402a-402c form a stripeset 2802 in data store 400. First and second data stripes 2804 and 2806 are shown stored in stripeset 2802, for purposes of illustration. For example, data stripes 2804 and 2806 may be stored in data store 400 by computer 900 of FIG. 9. Both of first and second data stripes 2804 and 2806 include data pages of a first data type ("first data type page") (e.g., database data) stored in each of storage devices 402a-402c. In an embodiment, storage devices 402a-402c each have an associated class variable 1302 having a value associated with the first data type when first and second data stripes 2804 and 2806 are stored therein.

For example, FIG. 29 shows a block diagram of storage devices 402a-402c, indicating respective class variables 2902a-2902c associated with storage devices 402a-402c. Example values for class variables 2902a-2902c for storage devices 402a-402c are shown below that may be present when data stripes 2804 and 2806 are stored in storage devices 402a-402c:

Class variable 2902a=1
Class variable 2902b=1
Class variable 2902c=1

Thus, in the current example, class variables 2902a-2902c each have a value of "1," which is representative of the first data type, and indicate data stripes 2804 and 2806 as having a class of the first data type.

In step 2704, the class variable is changed from the first value to a second value representative of a second data type. For instance, example changed values for class variables 2902a-2902c for storage devices 402a-402c are shown below:

Class variable 2902a=2
Class variable 2902b=2
Class variable 2902c=2

In this example, a value of "2" is representative of a second data type for data that may be stored in storage devices 402a-402c. Class variables 2902a-2902c associated with storage devices 402a-402c may be changed from the value of "1" to the value of "2" in various ways. For example, storage devices 402a-402c may each determine that they have reached a predetermined level of fullness (e.g., 50% or other predetermined level of filled storage medium, predetermined number of filled data pages, etc.). Storage controllers 1304 (FIG. 13) of each of storage devices 402a-402c may be configured to increment (or otherwise change/modify) their respective class variable 2902a-2902c when the predetermined level of fullness is reached.

In an embodiment, computer 900 (or other computer providing data to store in storage devices 402a-402c) may transmit a class indication with corresponding data to storage devices 402a-402c. The class indication may indicate the class of the corresponding data, and storage controllers 1304 of each of storage devices 402a-402c may be configured to change their class variables 2902a-2902c to match the received class indication. Alternatively, computer 900 may transmit an instruction to storage devices 402a-402c to increment (or otherwise modify) class variables 2902a-2902c.

In step 2706, at least one data page that includes second data of the second data type is stored in the storage device of the data store. For example, as shown in FIG. 28, a third data stripe 2808 may be stored in stripeset 2802 by computer 900 of FIG. 9. Third data stripe 2808 includes data pages of the second data type ("second data type page") (e.g., log data) stored in each of storage devices 402a-402c. Because class variables 2902a-2902c associated with storage devices 402a-402c have a value associated with the second data type when third data stripe 2808 is stored therein, third data stripe 2808 is stored as having a class of the second data type.

As such, stripeset 2802 of data store 400 stores two classes of data stripes—first and second data stripes 2804 and 2806 having a class associated with the first data type, and third data stripe 2808 having a class associated with the second data type. As such, stripeset 2802 is a multiclass stripeset. In embodiments, further classes of data stripes may be stored in stripeset 2802, as desired. Although we have described two data types, such as database data and log data, there are cases where it is desirable to segregate other types of data updates into separate classes. For example, it may be desirable to separate classes for small database records, large database records (such as large binary objects also known as BLOBs), garbage collected data, and/or different types of logs. A different class variable value may be associated with each type of data update.

Thus, embodiments are provided for storing multiple classes of data in a stripeset, where each class is represented by a class variable value (e.g., an integer). A device desiring to store data may be enabled to increment (or otherwise modify) the class variable of a stripeset by appending data in a different (e.g., a higher) class. The class of a stripeset may change when the associated storage devices reach a predefined fullness threshold, or for other reason.

E. Example Combination Embodiments

The embodiments described herein may be combined in any manner. For example, in an embodiment, sliding window stripesets and multiclass stripesets can be combined, such as by arranging stripesets of adjacent classes in adjacent groups of storage devices in decreasing order of class. For instance, FIG. 30 shows a block diagram of data store 400 including multiple stripesets that can slide and can overlap to form multiclass stripesets, according to an example embodiment. As shown in FIG. 30, a first stripeset 3002 includes storage devices 402a-402c and a second stripeset 3004 includes storage devices 402d and 402e. First stripeset 3002 stores a first data stripe 3006 (data pages 3010a-3010c stored in page slots 404y, 406b, and 408b) and second stripeset 3004 stores a second data stripe 3008 (data pages 3012a and 3012b stored in page slots 410a and 412a). In the current example, first stripeset 3002 is associated with a first data class and second stripeset 3004 is associated with a second data class. As such, class variables associated with storage devices 402a-402e in FIG. 30 may be as indicated below in Table 1:

TABLE 1

|  | storage device 402a | storage device 402b | storage device 402c | storage device 402d | storage device 402e |
| --- | --- | --- | --- | --- | --- |
| Class Variable: | 2 | 2 | 2 | 1 | 1 |

In Table 1, the class variable value of 2 is associated with the first data class stored in first stripeset 3002, and the class variable value of 1 is associated with the second data class stored in second stripeset 3004.

Data stripes may be stored in first and second stripesets 3002 and 3004 in various ways, and overflow of storage devices 402a-402e may be handled in various ways. For instance, FIG. 31 shows a flowchart 3100 providing a process for storing a data stripe, according to an example embodiment. Flowchart 3100 may be performed by a device storing data in a data store, such as computer 900 shown in FIG. 9, and/or may be performed by one or more storage devices in the data store. Further structural and operational embodiments will be apparent to persons skilled in the relevant art(s) based on the discussion regarding flowchart 3100. Flowchart 3100 is described as follows.

As shown in FIG. 31, flowchart 3100 begins with step 3102. In step 3102, a first set of data pages is provided to be stored in a first stripeset of a data store. For instance, computer 900 (FIG. 9) may provide a third data stripe that includes a set of data pages to be stored in first stripeset 3002.

In step 3104, the first storage device is determined to be full. For example, in an embodiment, storage device 402a may determine that storage device 402a is full, as indicated in FIG. 30, where each of page slots 404a-404y store a respective data page.

In step 3106, the first storage device is removed from the first stripeset. For example, in an embodiment, because storage device 402a was determined to be full in step 3104, storage device 402a is removed from first stripeset 3002. The class variable associated with storage device 402a may be incremented (or otherwise modified) to a value (e.g., "3") that indicates a full state for storage device 402a.

In step 3108, a third storage device of the data store is added to the first stripeset, the third storage device of the data store having an associated class variable that indicates a class of a second stripeset of the data store. For example, as shown in FIG. 30, it may be desired to add the next consecutive storage device 402 to first stripeset 3002 in the logical sequence of storage devices 402a-402y, which is storage device 402d. FIG. 30 indicates storage device 402d as included in second stripeset 3004, and has a class variable indicated in Table 1 above representative of second stripeset 3004. According to step 3108, storage device 402d is added to first stripeset 3002.

In step 3110, the class variable is changed to indicate a class of the first stripeset. For example, the class variable of storage device 402d, which previously indicated the class of second stripeset 3004, may be incremented (or otherwise modified) to indicate the class of first stripeset 3002. As such, Table 2 shown below indicates the modified class variables associated with storage devices 402a-402e:

TABLE 2

|  | storage device 402a | storage device 402b | storage device 402c | storage device 402d | storage device 402e |
| --- | --- | --- | --- | --- | --- |
| Class Variable: | 3 | 2 | 2 | 2 | 1 |

In step 3112, the first set of data pages is stored as a stripe in the first stripeset, including storing a data page of the first set of data pages in the third storage device. For example, the third data stripe provided in step 3102 may be stored in first stripeset 3002. For instance, FIG. 32 shows a block diagram of data store 400 of FIG. 30, with the third data stripe provided in step 3102 stored in first stripeset 3002 as a third data stripe 3202. As shown in FIG. 32, first stripeset 3002 includes first-third data pages 3204a-3204c stored in storage devices 402b-402d (page slots 406c, 408c, and 410b), respectively. Furthermore, third data stripe 3202 overlaps with second data stripe 3008, both having a data page stored in storage device 402d.

Thus, flowchart 3100 enables sliding window stripesets. Using sliding window stripesets, if a storage device of a first stripeset becomes full, the first stripeset may advance by adding a next storage device of the data store to the first stripeset, even if the next storage device is included in a second stripeset. In an embodiment, the next storage device may be added to the first stripeset if the value of the class variable of the first stripeset is greater than (or has other desired relationship with) the value of the class variable of the second stripeset. In the above example, the value of the class variable of first stripeset 3002 ("2") is greater than (or has other desired relationship with) the value of the class variable of second stripeset 3004 ("1"), and thus the class variable of storage device 402d may incremented, and storage device 402d may be added to first stripeset 3002 from second stripeset 3004.

If stripesets are arranged in this manner, stripesets can be represented by identifying the storage device ID of the first storage device of the highest class and the storage device ID of the last storage device of each stripeset. The storage device ID of the last storage device may also serve to identify the lower bound of the next lower class. If the highest class has a fixed, known rank, then the storage device ID of the first storage device of the highest class need not be indicated, because it can be calculated from the storage device ID of the last storage device of the highest class. In fact, any class whose stripeset has a fixed rank can allow one of the stripeset boundaries to be dispensed with.

Note that with regard to FIG. 32, because the value of the class variable of storage device 402d is no longer the class of second stripeset 3004, a next append operation of the class of second stripeset 3004 to storage devices 402d and 402e will fail, because storage device 402d will reject the append operation. In such case, the device invoking the append operation (e.g., computer 900) may respond by sliding second stripeset 3004. In such case, storage device 402d is removed from second stripeset 3004, and a next storage device in the logical sequence may be added to second stripeset 3004, which is storage device 402f (not actually shown in FIG. 32).

For instance, FIG. 33 shows a flowchart 3300 providing a process for storing a data stripe, according to an example embodiment. Flowchart 3300 may be performed subsequently to flowchart 3100 shown in FIG. 31, for instance. Flowchart 3300 may be performed by a device storing data in a data store, such as computer 900 shown in FIG. 9, and/or may be performed by one or more storage devices in the data store. Further structural and operational embodiments will be apparent to persons skilled in the relevant art(s) based on the discussion regarding flowchart 3300. Flowchart 3300 is described as follows.

As shown in FIG. 33, flowchart 3300 begins with step 3302. In step 3302, a second set of data pages is provided to be stored in the second stripeset, the second stripeset including the third storage device. For instance, computer 900 (FIG. 9) (or other device) may provide a fourth data stripe that includes a set of data pages to be stored in second stripeset 3004 of FIG. 32.

In step 3304, the class variable of the third storage device is determined to be a higher class than the class of the second stripeset. The device providing the fourth data stripe may attempt to store a data page of the fourth data stripe in storage device 402d, which previously had a class variable indicating a class of second stripeset 3004. However, storage device 402d has a class variable indicating a class of first stripeset 3002, which is a higher class than that of second stripeset 3004.

In step 3306, the third storage device is removed from the second stripeset. Because the class variable associated with storage device 402d has been raised (or otherwise modified) to be higher than the class of second stripeset 3004, data stripes having a class indicator that indicates the class of second stripeset 3004 can no longer be stored in storage device 402d. Thus, storage device 402d is removed from second stripeset 3004.

In step 3308, a fourth storage device of the data store is added to the second stripeset. For example, as shown in FIG. 32, it may be desired to add the next consecutive storage device 402 to second stripeset 3004 in the logical sequence of storage devices 402a-402y, which is storage device 402f (not visible in FIG. 32). If storage device 402f has an associated class variable indicating a lower class than the class of second stripeset 3004, storage device 402f may be added to second stripeset 3004.

In step 3310, a class variable of the fourth storage device is changed to indicate the class of the second stripeset. For example, the class variable of storage device 402f, which previously indicated a class below that of second stripeset 3004, may be incremented (or otherwise modified) to indicate the class of second stripeset 3004.

In step 3312, the second set of data pages is stored as a stripe in the second stripeset, including storing a data page of the second set of data pages in the fourth storage device. For example, the fourth data stripe provided in step 3302 may be stored in second stripeset 3004, including storing a data page of the fourth data stripe in storage device 402f.

Note that if the data pages of the rejected append operation are unordered with respect to each other, the data page that was attempted to be stored in storage device 402d may be stored in storage device 402f. Alternatively, the data pages may be shifted such that the data pages intended to be consecutively stored in storage device 402d and storage device 402e are stored in storage device 402e and storage device 402f, respectively. In such an embodiment, the device attempting to store the data stripe transmits a new append operation that writes the stripe to the storage devices in the desired order. This may waste page slots if the previous append operation that failed to store a data page in storage device 402d stored a data page in a page slot of storage device 402e.

In an embodiment, to avoid wasted page slots, data pages are enabled to be reordered in a stripe reference. For instance, each data page in a stripe reference may include an index that indicates a position of the data page in the data stripe. For example, for third data stripe 3202 in FIG. 32, a stripe reference might be an indicator for storage device 402b (e.g., "2") and the vector [(1, 3), (2, 3), (3, 2)], where (1, 3) indicates that the first page of data stripe 3202 is stored in page slot 3 of storage device 402b, (2, 3) indicates that the second page of data stripe 3202 is stored in page slot 3 of storage device 402c, and (3, 2) indicates that the third page of data stripe 3202 is stored in page slot 2 of storage device 402d. Thus, if data stripe 3202 was stored in the same location, but with the data pages reordered, the reordering of the data pages may be indicated in the vector of the stripe reference. For example, the stripe reference of "2" [(3, 3), (1, 3), (2, 2),] indicates that the third data page of data stripe 3202 is stored in the third page slot of storage device 402b, etc.

Thus, in an embodiment, a striping technique is provided where a first stripeset of a first, higher class is followed by a second stripeset of a second, lower class. When one or more storage devices at the beginning of the first stripeset overflow, an equal number of storage devices are added to the first stripeset from the second stripeset, thereby causing the second stripeset to add an equal number of storage devices, etc., in a cascading fashion.

Flowchart 1900 in FIG. 19 may be adapted to determine an active stripeset in a data store that includes multiple classes. For example, the GetFirstNonEmpty operation described above (e.g., step 1902) may be performed as described above. The GetActiveFromRange operation described above (e.g., step 1904) may be modified. If the class of a middle storage device is the desired class, then it is returned. If the class of a middle storage device is less than the desired class, then the result of GetActiveFromRange(low, mid) is returned. Otherwise the result of GetActiveFromRange(mid, high) is returned. The GetStripesetFromActive operation (e.g., step 1906) is performed in a manner to determine the range of storage devices that are of the same class as the active storage device returned by the GetActiveFromRange operation.

III. Further Example Embodiments

Data stripe storage interface module 902 (FIGS. 9, 20), storage controller 1304 (FIGS. 13, 16), class comparator 1602 (FIG. 16), storage cleaning module 1702 (FIG. 17), storage controller 1802 (FIG. 18), stripeset determiner module 2002 (FIGS. 20, 21), non-empty storage device determiner module 2102 (FIG. 21), active storage device determiner module 2104 (FIG. 21), and active range determiner module 2106 (FIG. 21) may be implemented in hardware, software, firmware, or any combination thereof. For example, data stripe storage interface module 902, storage controller 1304, class comparator 1602, storage cleaning module 1702, storage controller 1802, stripeset determiner module 2002, non-empty storage device determiner module 2102, active storage device determiner module 2104, and/or active range determiner module 2106 may be implemented as computer program code configured to be executed in one or more processors. Alternatively, data stripe storage interface module 902, storage controller 1304, class comparator 1602, storage cleaning module 1702, storage controller 1802, stripeset determiner module 2002, non-empty storage device determiner module 2102, active storage device determiner module 2104, and/or active range determiner module 2106 may be implemented as hardware logic/electrical circuitry.

FIG. 34 depicts an exemplary implementation of a computer 3400 in which embodiments of the present invention may be implemented. For instance, computers 102a-102c (FIG. 1), computer 900 (FIG. 9), and/or computer 2000 (FIG. 20) may be implemented similarly to computer 3400, and may include one or more features of computer 3400 and/or alternative features. Computer 3400 may be a general-purpose computing device in the form of a conventional personal computer, a mobile computer, or a workstation, for example, or computer 3400 may be a special purpose computing device. The description of computer 3400 provided herein is provided for purposes of illustration, and is not intended to be limiting. Embodiments of the present invention may be implemented in further types of computer systems, as would be known to persons skilled in the relevant art(s).

As shown in FIG. 34, computer 3400 includes a processing unit 3402, a system memory 3404, and a bus 3406 that couples various system components including system memory 3404 to processing unit 3402. Bus 3406 represents one or more of any of several types of bus structures, including a memory bus or memory controller, a peripheral bus, an accelerated graphics port, and a processor or local bus using any of a variety of bus architectures. System memory 3404 includes read only memory (ROM) 3408 and random access memory (RAM) 3410. A basic input/output system 3412 (BIOS) is stored in ROM 3408.

Computer 3400 also has one or more of the following drives: a hard disk drive 3414 for reading from and writing to a hard disk, a magnetic disk drive 3416 for reading from or writing to a removable magnetic disk 3418, and an optical disk drive 3420 for reading from or writing to a removable optical disk 3422 such as a CD ROM, DVD ROM, or other optical media. Hard disk drive 3414, magnetic disk drive 3416, and optical disk drive 3420 are connected to bus 3406 by a hard disk drive interface 3424, a magnetic disk drive interface 3426, and an optical drive interface 3428, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 3430, one or more application programs 3432, other program modules 3434, and program data 3436. Application programs 3432 or program modules 3434 may include, for example, computer program logic for implementing data stripe storage interface module 902, storage controller 1304, class comparator 1602, storage cleaning module 1702, storage controller 1802, stripeset determiner module 2002, non-empty storage device determiner module 2102, active storage device determiner module 2104, active range determiner module 2106, flowchart 500, flowchart 800, flowchart 1000, flowchart 1100, flowchart 1400, flowchart 1500, flowchart 1900, flowchart 2200, flowchart 2400, flowchart 2500, flowchart 2700, flowchart 3100, and/or flowchart 3300 (including any step of flowcharts 500, 800, 1000, 1100, 1400, 1500, 1900, 2200, 2400, 2500, 2700, 3100, and 3300), and/or any further embodiments as described above.

A user may enter commands and information into the computer 3400 through input devices such as keyboard 3438 and pointing device 3440. Other input devices (not shown) may include a microphone, joystick, game pad, satellite dish, scanner, or the like. These and other input devices are often connected to the processing unit 3402 through a serial port interface 3442 that is coupled to bus 3406, but may be connected by other interfaces, such as a parallel port, game port, or a universal serial bus (USB).

A monitor 3444 or other type of display device is also connected to bus 3406 via an interface, such as a video adapter 3446. In addition to the monitor, computer 3400 may include other peripheral output devices (not shown) such as speakers and printers.

Computer 3400 is connected to a network 3448 (e.g., the Internet) through a network adaptor or interface 3450, a modem 3452, or other means for establishing communications over the network. Modem 3452, which may be internal or external, is connected to bus 3406 via serial port interface 3442.

As used herein, the terms "computer program medium" and "computer-readable medium" are used to generally refer to media such as the hard disk associated with hard disk drive 3414, removable magnetic disk 3418, removable optical disk 3422, as well as other media such as flash memory cards, digital video disks, random access memories (RAMs), read only memories (ROM), and the like.

As noted above, computer programs and modules (including application programs 3432 and other program modules 3434) may be stored on the hard disk, magnetic disk, optical disk, ROM, or RAM. Such computer programs may also be received via network interface 3450 or serial port interface 3442. Such computer programs, when executed or loaded by an application, enable computer 3400 to implement features of embodiments of the present invention discussed herein. Accordingly, such computer programs represent controllers of the computer 3400.

The invention is also directed to computer program products comprising software stored on any computer useable medium. Such software, when executed in one or more data processing devices, causes a data processing device(s) to operate as described herein. Embodiments of the present invention employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMs, nanotechnology-based storage devices, and the like.

In another embodiment, a method includes: storing data that includes M data pages as a stripe in a stripeset of a data store, the stripeset including N storage devices; and generating a reference for the stripe that includes an identifier for a storage device of the N storage devices in which a first data page of the M data pages is stored and a vector that includes a page slot indicator for each of the M data pages, each page slot indicator indicating for a corresponding data page of the M data pages a page slot of a storage device of the N storage devices in which the corresponding data page is stored.

The N storage devices of the stripeset may be associated in a logical sequence, the logical sequence including a first storage device of the N storage devices at a logical first end of the stripeset and a second storage device of the N storage devices at a logical second end of the stripeset. The storing may include: storing the first data page of the M data pages in the first storage device; and storing each subsequent data page of the M data pages in a corresponding next consecutive storage device in the logical sequence from the first storage device.

The N storage devices of the stripeset may be associated in a logical sequence, the logical sequence including a first storage device of the N storage devices at a logical first end of the stripeset and a second storage device of the N storage devices at a logical second end of the stripeset. The method may further include: determining that the first storage device is full; removing the first storage device from the stripeset;

and adding a next storage device of the data store to the stripeset to be logically positioned at the logical second end of the stripeset adjacent to the second storage device.

Each storage device may include a flash memory device.

In another embodiment, a method comprises: associating a class variable with a corresponding storage device of a data store, the class variable indicating a store status of the corresponding storage device, the data store including a plurality of storage devices having associated class variables; enabling the class variable to be modified by a first computer that stores a data page in the corresponding storage device; and enabling the class variable to be reset by a second computer that erases data stored in the corresponding storage device.

In an embodiment, the enabling the class variable to be modified by a computer that stores a data page in the corresponding storage device comprises: receiving a request from the first computer to store the data page in the storage device, the request including a class indication; enabling the data page to be stored in a next available page slot of the storage device if the class indication has a first relationship with the class variable; enabling the data page to be stored in a next available page slot of the storage device and modifying the class variable if the class indication has a second relationship with the class variable; and generating a response to the request that includes the class variable if the class indication has a third relationship with the class variable.

In an embodiment, the associating comprises: configuring the class variable to have a first value to indicate that the corresponding storage device is empty, a second value to indicate that the corresponding storage device is active, or a third value to indicate that the corresponding storage device is full.

In an embodiment, the associating comprises: configuring the class variable to have a first value to indicate that the corresponding storage device is empty, a second value to indicate that the corresponding storage device is full, and a plurality of additional values that each indicate a corresponding type of stripe data storable in the corresponding storage device.

In an embodiment, the method further comprises: incrementing the class variable if the corresponding storage devices reaches a predetermined fullness threshold.

In an embodiment, the method further comprises: storing at least one data page that includes first data of a first data type in a storage device of the data store when the class variable has a first value; changing the class variable from the first value to a second value representative of a second data type; and storing at least one data page that includes second data of the second data type in the storage device of the data store.

In an embodiment, the data page is a data page of a data stripe.

In another embodiment, in a method for determining a stripeset in a plurality of storage devices in a data store, the plurality of storage devices are associated in a logical sequence, the logical sequence including a first storage device at a logical first end of the plurality of storage devices and a second storage device at a logical second end of the plurality of storage devices, the method comprising: determining a logically closest non-empty storage device of the plurality of storage devices to the logical first end; determining an active storage device of the plurality of storage devices in a range of the logical sequence from the logically closest non-empty storage device to the logical second end; and determining a continuous range of active storage devices in the plurality of storage devices that includes the determined active storage device.

Each storage device of the plurality of storage devices may have an associated epoch number that has an initial value and that is modified each time the associated storage device is erased, and the determining a logically closest non-empty storage device of the plurality of storage devices to the logical first end may include: indicating the first storage device to be the logically closest non-empty storage device if the first storage device is non-empty; indicating that all of the plurality of storage devices are empty if the first and second storage devices are empty and have a same epoch value; and performing a binary search over the logical sequence from the first storage device to the second storage device to determine a logically closest storage device to the logical first end having an epoch number that is different from an epoch number of the first storage device.

The determining an active storage device of the plurality of storage devices in a range of the logical sequence from the logically closest non-empty storage device to the logical second end may include: indicating the logically closest non-empty storage device to be the active storage device if the logically closest non-empty storage device is active; indicating the second storage device to be the active storage device if the second storage device is active and the logically closest non-empty storage device is not active; and performing a binary search over the logical sequence from the logically closest non-empty storage device to the second storage device to determine an active storage device.

The determining a continuous range of active storage devices in the plurality of storage devices that includes the determined active storage device may include: searching the plurality of storage devices in the logical sequence from the determined active storage device towards the first storage device for a first non-active storage device; searching the plurality of storage devices in the logical sequence from the determined active storage device towards the second storage device for a second non-active storage device; and indicating the continuous range of active storage devices to be a continuous range of storage devices between the first non-active storage device and the second non-active storage device.

In another embodiment, a method includes: providing a first set of data pages to be stored in a first stripeset of a data store, the first stripeset including M storage devices, the M storage devices of the first stripeset being associated in a logical sequence that includes a first storage device of the M storage devices at a logical first end of the first stripeset and a second storage device of the M storage devices at a logical second end of the first stripeset; determining that the first storage device is full; removing the first storage device from the first stripeset; adding a third storage device of the data store to the first stripeset, the third storage device of the data store having an associated class variable that indicates a class of a second stripeset of the data store; changing the class variable to indicate a class of the first stripeset; and storing the first set of data pages as a stripe in the first stripeset, including storing a data page of the first set of data pages in the third storage device.

The method may further include: providing a second set of data pages to be stored in the second stripeset, the second stripeset including the third storage device; determining that the class variable of the third storage device is a higher class than the class of the second stripeset; removing the third storage device from the second stripeset; adding a fourth storage device of the data store to the second stripeset; changing a class variable of the fourth storage device to indicate the class of the second stripeset; and storing the second set of data pages as a stripe in the second stripeset, including storing a data page of the second set of data pages in the fourth storage device.

IV. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for determining a stripeset in a plurality of storage devices in a data store, the plurality of storage devices being associated in a logical sequence, the logical sequence including a first storage device at a logical first end of the plurality of storage devices and a second storage device at a logical second end of the plurality of storage devices, comprising:
   determining a logically closest non-empty storage device of the plurality of storage devices to the logical first end;
   determining an active storage device of the plurality of storage devices in a range of the logical sequence from the logically closest non-empty storage device to the logical second end; and
   determining a continuous range of active storage devices in the plurality of storage devices that includes the determined active storage device.

2. The method of claim 1, wherein each storage device of the plurality of storage devices has an associated epoch number that has an initial value and that is modified each time the associated storage device is erased, wherein said determining a logically closest non-empty storage device of the plurality of storage devices to the logical first end comprises:
   indicating the first storage device to be the logically closest non-empty storage device if the first storage device is non-empty;
   indicating that all of the plurality of storage devices are empty if the first and second storage devices are empty and have a same epoch value; and
   performing a binary search over the logical sequence from the first storage device to the second storage device to determine a logically closest storage device to the logical first end having an epoch number that is different from an epoch number of the first storage device.

3. The method of claim 2, wherein the initial value is modified by incrementing the initial value.

4. The method of claim 2, wherein said performing the binary search comprises:
   determining a middle storage device between the first storage device at the logical first end of the plurality of storage devices and the second storage device at the logical second end of the plurality of storage devices;
   determining a storage device between the middle storage device and the second storage device at the logical second end of the plurality of storage devices in response to determining that the middle storage device and the first storage device at the logical first end of the plurality of storage devices have the same epoch value; and
   determining a storage device between the first storage device at the logical first end of the plurality of storage devices and the middle storage device in response to determining that the first storage device at the logical first end of the plurality of storage devices and the middle storage device have different epoch values.

5. The method of claim 1, wherein said determining an active storage device of the plurality of storage devices in a range of the logical sequence from the logically closest non-empty storage device to the logical second end comprises:
   indicating the logically closest non-empty storage device to be the active storage device if the logically closest non-empty storage device is active;
   indicating the second storage device to be the active storage device if the second storage device is active and the logically closest non-empty storage device is not active; and
   performing a search operation over the logical sequence from the logically closest non-empty storage device to the second storage device to determine an active storage device.

6. The method of claim 5, wherein the search operation is a binary search performed over the logical sequence from the logically closest non-empty storage device to the second storage device.

7. The method of claim 5, wherein the search operation is an exponential probing sequence performed over the logical sequence from the logically closest non-empty storage device to the second storage device.

8. The method of claim 1, wherein said determining a continuous range of active storage devices in the plurality of storage devices that includes the determined active storage device comprises:
   searching the plurality of storage devices in the logical sequence from the determined active storage device towards the first storage device for a first non-active storage device;
   searching the plurality of storage devices in the logical sequence from the determined active storage device towards the second storage device for a second non-active storage device; and
   indicating the continuous range of active storage devices to be a continuous range of storage devices between the first non-active storage device and the second non-active storage device.

9. A system, comprising:
   a data store comprising a plurality of storage devices, the plurality of storage devices being associated in a logical sequence, the logical sequence including a first storage device at a logical first end of the plurality of storage devices and a second storage device at a logical second end of the plurality of storage devices; and
   a processor coupled to the data store, the processor configured to:
      determine a logically closest non-empty storage device of the plurality of storage devices to the logical first end;
      determine an active storage device of the plurality of storage devices in a range of the logical sequence from the logically closest non-empty storage device to the logical second end; and
      determine a continuous range of active storage devices in the plurality of storage devices that includes the determined active storage device.

10. The system of claim 9, wherein each storage device of the plurality of storage devices has an associated epoch number that has an initial value and that is modified each time the associated storage device is erased, wherein to determine a logically closest non-empty storage device of the plurality of storage devices to the logical first end, the processor is configured to:
- indicate the first storage device to be the logically closest non-empty storage device if the first storage device is non-empty;
- indicate that all of the plurality of storage devices are empty if the first and second storage devices are empty and have a same epoch value; and
- perform a binary search over the logical sequence from the first storage device to the second storage device to determine a logically closest storage device to the logical first end having an epoch number that is different from an epoch number of the first storage device.

11. The system of claim 10, wherein to perform the binary search, the processor is configured to:
- determine a middle storage device between the first storage device at the logical first end of the plurality of storage devices and the second storage device at the logical second end of the plurality of storage devices;
- determine a storage device between the middle storage device and the second storage device at the logical second end of the plurality of storage devices in response to determining that the middle storage device and the first storage device at the logical first end of the plurality of storage devices have the same epoch value; and
- determine a storage device between the first storage device at the logical first end of the plurality of storage devices and the middle storage device in response to determining that the first storage device at the logical first end of the plurality of storage devices and the middle storage device have different epoch values.

12. The system of claim 9, wherein to determine an active storage device of the plurality of storage devices in a range of the logical sequence from the logically closest non-empty storage device to the logical second end, the processor is configured to:
- indicate the logically closest non-empty storage device to be the active storage device if the logically closest non-empty storage device is active;
- indicate the second storage device to be the active storage device if the second storage device is active and the logically closest non-empty storage device is not active; and
- perform a search operation over the logical sequence from the logically closest non-empty storage device to the second storage device to determine an active storage device.

13. The system of 12, wherein the search operation is a binary search performed over the logical sequence from the logically closest non-empty storage device to the second storage device.

14. The system of 12, wherein the search operation is an exponential probing sequence performed over the logical sequence from the logically closest non-empty storage device to the second storage device.

15. The system of claim 9, wherein to determine a continuous range of active storage devices in the plurality of storage devices that includes the determined active storage device, the processor is configured to:
- search the plurality of storage devices in the logical sequence from the determined active storage device towards the first storage device for a first non-active storage device;
- search the plurality of storage devices in the logical sequence from the determined active storage device towards the second storage device for a second non-active storage device; and
- search the continuous range of active storage devices to be a continuous range of storage devices between the first non-active storage device and the second non-active storage device.

16. A computer-readable medium that stores computer-executable instructions that when executed cause at least one processor to determine a stripeset in a plurality of storage devices in a data store, the plurality of storage devices being associated in a logical sequence, the logical sequence including a first storage device at a logical first end of the plurality of storage devices and a second storage device at a logical second end of the plurality of storage devices, the computer-executable instructions configured to perform a method, the method comprising:
- determining a logically closest non-empty storage device of the plurality of storage devices to the logical first end;
- determining an active storage device of the plurality of storage devices in a range of the logical sequence from the logically closest non-empty storage device to the logical second end; and
- determining a continuous range of active storage devices in the plurality of storage devices that includes the determined active storage device.

17. The computer-readable medium of claim 16, wherein each storage device of the plurality of storage devices has an associated epoch number that has an initial value and that is modified each time the associated storage device is erased, wherein said determining a logically closest non-empty storage device of the plurality of storage devices to the logical first end comprises:
- indicating the first storage device to be the logically closest non-empty storage device if the first storage device is non-empty;
- indicating that all of the plurality of storage devices are empty if the first and second storage devices are empty and have a same epoch value; and
- performing a binary search over the logical sequence from the first storage device to the second storage device to determine a logically closest storage device to the logical first end having an epoch number that is different from an epoch number of the first storage device.

18. The computer-readable medium of claim 17, wherein said performing the binary search comprises:
- determining a middle storage device between the first storage device at the logical first end of the plurality of storage devices and the second storage device at the logical second end of the plurality of storage devices;
- determining a storage device between the middle storage device and the second storage device at the logical second end of the plurality of storage devices in response to determining that the middle storage device and the first storage device at the logical first end of the plurality of storage devices have the same epoch value; and
- determining a storage device between the first storage device at the logical first end of the plurality of storage devices and the middle storage device in response to determining that the first storage device at the logical first end of the plurality of storage devices and the middle storage device have different epoch values.

19. The computer-readable medium of claim 16, wherein said determining an active storage device of the plurality of storage devices in a range of the logical sequence from the logically closest non-empty storage device to the logical second end comprises:
- indicating the logically closest non-empty storage device to be the active storage device if the logically closest non-empty storage device is active;
- indicating the second storage device to be the active storage device if the second storage device is active and the logically closest non-empty storage device is not active; and
- performing a binary search over the logical sequence from the logically closest non-empty storage device to the second storage device to determine an active storage device.

20. The computer-readable medium of claim 16, wherein said determining a continuous range of active storage devices in the plurality of storage devices that includes the determined active storage device comprises:
- searching the plurality of storage devices in the logical sequence from the determined active storage device towards the first storage device for a first non-active storage device;
- searching the plurality of storage devices in the logical sequence from the determined active storage device towards the second storage device for a second non-active storage device; and
- indicating the continuous range of active storage devices to be a continuous range of storage devices between the first non-active storage device and the second non-active storage device.

* * * * *